(12) United States Patent
Shoffler

(10) Patent No.: US 10,400,746 B1
(45) Date of Patent: Sep. 3, 2019

(54) WIND TURBINE

(71) Applicant: David A. Shoffler, Marion Heights, PA (US)

(72) Inventor: David A. Shoffler, Marion Heights, PA (US)

( * ) Notice: Subject to any disclaimer, the term of this patent is extended or adjusted under 35 U.S.C. 154(b) by 249 days.

(21) Appl. No.: 15/606,028

(22) Filed: May 26, 2017

Related U.S. Application Data

(63) Continuation-in-part of application No. 14/272,013, filed on May 7, 2014, now Pat. No. 9,695,801.

(60) Provisional application No. 61/820,887, filed on May 8, 2013, provisional application No. 61/916,357, filed on Dec. 16, 2013.

(51) Int. Cl.
    *F03D 3/04*     (2006.01)
    *F03D 3/00*     (2006.01)
    *F03D 3/06*     (2006.01)
    *F03D 9/25*     (2016.01)

(52) U.S. Cl.
    CPC ........... *F03D 3/0409* (2013.01); *F03D 3/005* (2013.01); *F03D 3/061* (2013.01); *F03D 3/062* (2013.01); *F03D 9/25* (2016.05)

(58) Field of Classification Search
    CPC . F01D 5/12; F01D 5/20; Y02E 10/721; Y02E 10/74; F03D 3/0409; F03D 1/0675; F03B 3/183; F05B 2240/12
    See application file for complete search history.

(56) References Cited

U.S. PATENT DOCUMENTS

| | | | | |
|---|---|---|---|---|
| 4,684,817 A | * | 8/1987 | Goldwater | F03D 3/067 290/55 |
| 8,425,195 B2 | * | 4/2013 | Rudling | F03D 1/0675 416/226 |
| 9,309,863 B2 | * | 4/2016 | Foss | F41F 1/06 |
| 2009/0087300 A1 | * | 4/2009 | Cassidy | F03D 1/0608 415/4.3 |
| 2010/0143146 A1 | * | 6/2010 | Bell | F03D 1/06 416/233 |
| 2013/0115069 A1 | * | 5/2013 | Zha | F03D 3/0409 415/191 |
| 2013/0129509 A1 | * | 5/2013 | Manning | F03D 3/068 416/17 |
| 2013/0287591 A1 | * | 10/2013 | Plourde | F03D 3/061 416/90 R |
| 2014/0044521 A1 | * | 2/2014 | Bae | F03B 17/063 415/7 |
| 2014/0064980 A1 | * | 3/2014 | Griesel | F03D 1/0675 416/226 |
| 2018/0223798 A1 | * | 8/2018 | Caruso | F03D 1/0675 |

* cited by examiner

*Primary Examiner* — Jesse S Bogue
(74) *Attorney, Agent, or Firm* — John J. Elnitski, Jr.

(57) ABSTRACT

A wind turbine having at least two blades mounted to a blade retainer and a load shaft connected to the blade retainer, such that movement of the blades due to wind causes rotation of the load shaft. The wind turbine includes a frame assembly surrounding the turbine assembly. The frame assembly includes a plurality of vanes to direct wind inside the frame assembly and towards the blades of the turbine assembly. The vanes have a half circle shaped leading edge pointing to an outside perimeter of the frame assembly. The half circle leading edge has two ends and the vanes have a side extending from each of the ends of the half circle that come together to form a trailing edge.

13 Claims, 23 Drawing Sheets

WIND TURBINE

This application is a Continuation In Part of U.S. application Ser. No. 14/272,013 and claims the benefit of and incorporates by reference U.S. application Ser. No. 14/272,013 filed May 7, 2014; U.S. Provisional Application No. 61/820,887 filed May 8, 2013 and U.S. Provisional Application No. 61/916,357 filed Dec. 16, 2013.

BACKGROUND

The present invention generally relates to wind turbines. More specifically, the present invention relates vertical wind turbines and surface shapes that enhance fluid dynamics about shapes.

There are many vertical wind turbines on the market. Vertical wind turbines are less efficient than horizontal wind turbines. But, there are problems associated with horizontal wind turbines. Horizontal wind turbines are large and considered an eyesore on hillsides. Horizontal wind turbines produce noise, are known to kill wild life that attempt to fly past them and have even been involved in aircraft accidents. If the efficiently of smaller vertical wind turbines could be improved, they could be used at individual homes and would not have the drawbacks mentioned above for horizontal wind turbines.

It is an object of the present invention to provide an improved vertical wind turbine.

SUMMARY OF THE INVENTION

A wind turbine having at least two blades mounted to a blade retainer and a load shaft connected to the blade retainer, such that movement of the blades due to wind causes rotation of the load shaft. The wind turbine includes a frame assembly surrounding the turbine assembly. The frame assembly includes a plurality of vanes to direct wind inside the frame assembly and towards the blades of the turbine assembly. The vanes have a half circle shaped leading edge pointing to an outside perimeter of the frame assembly. The half circle leading edge has two ends and the vanes have a side extending from each of the ends of the half circle that come together to form a trailing edge.

DETAILED DESCRIPTION

Figure 1:
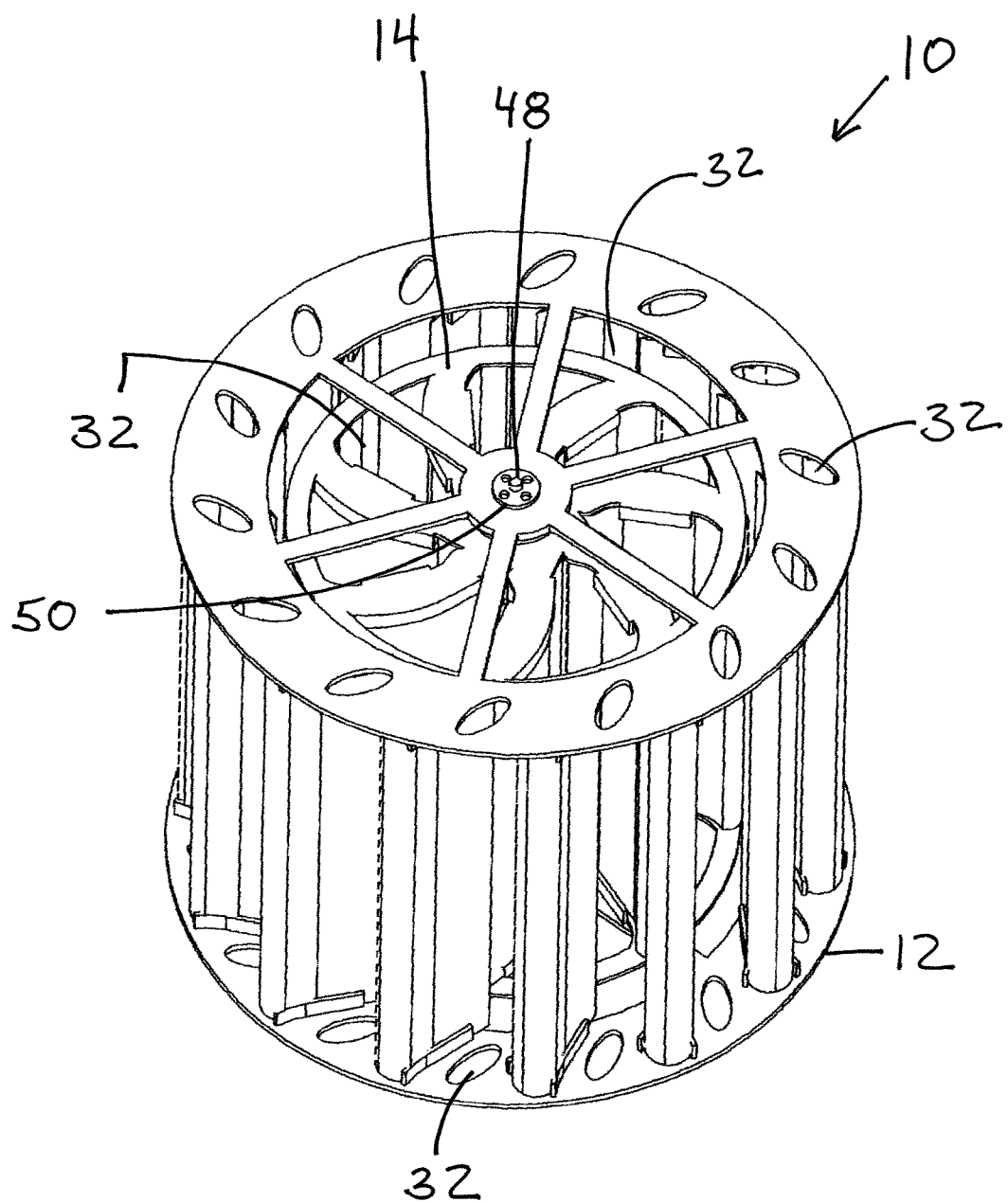
FIG. 1 is a perspective view of a wind turbine according to the present invention.
Figure 2:
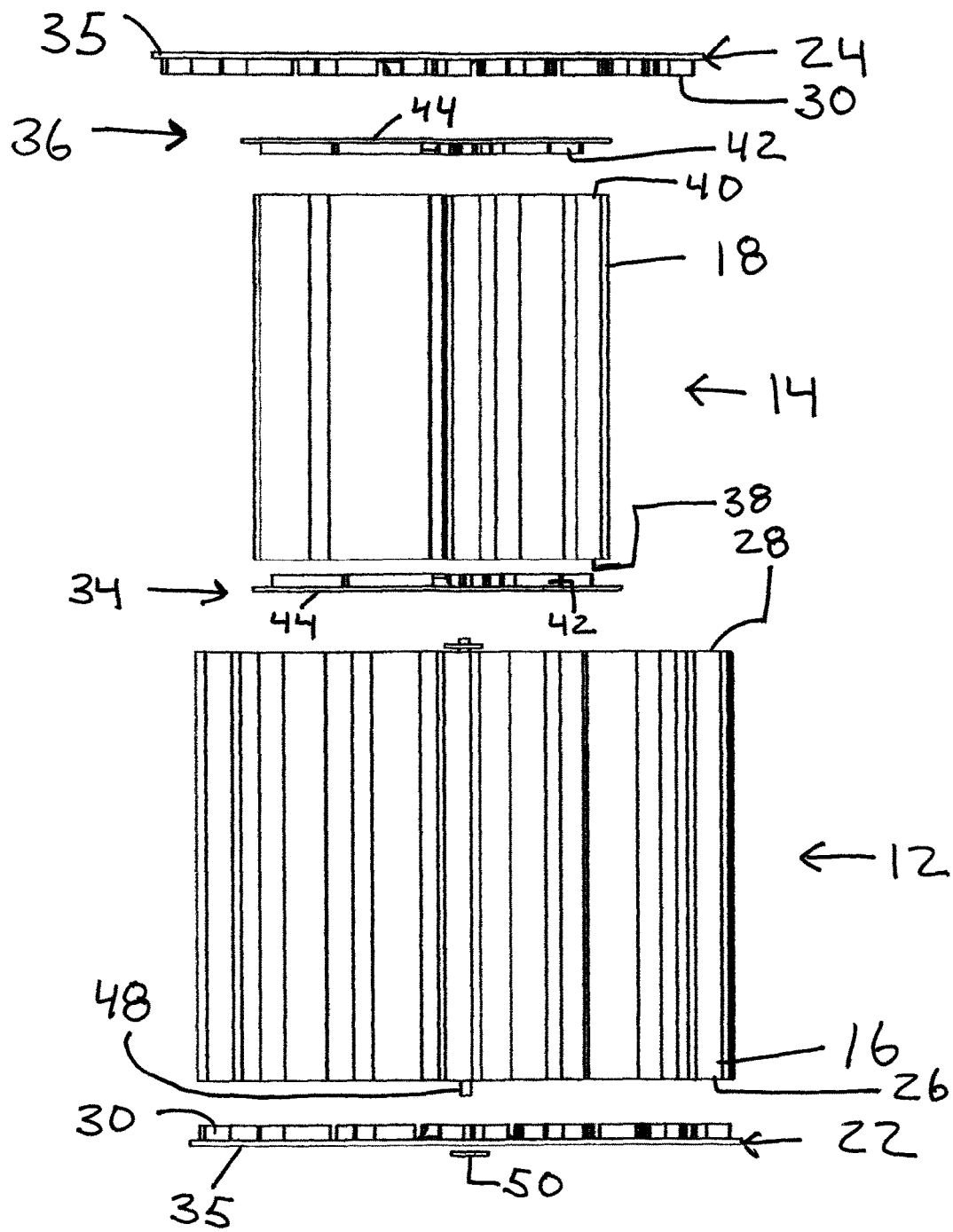
FIG. 2 is an exploded view of a wind turbine according to the present invention.
Figure 3:
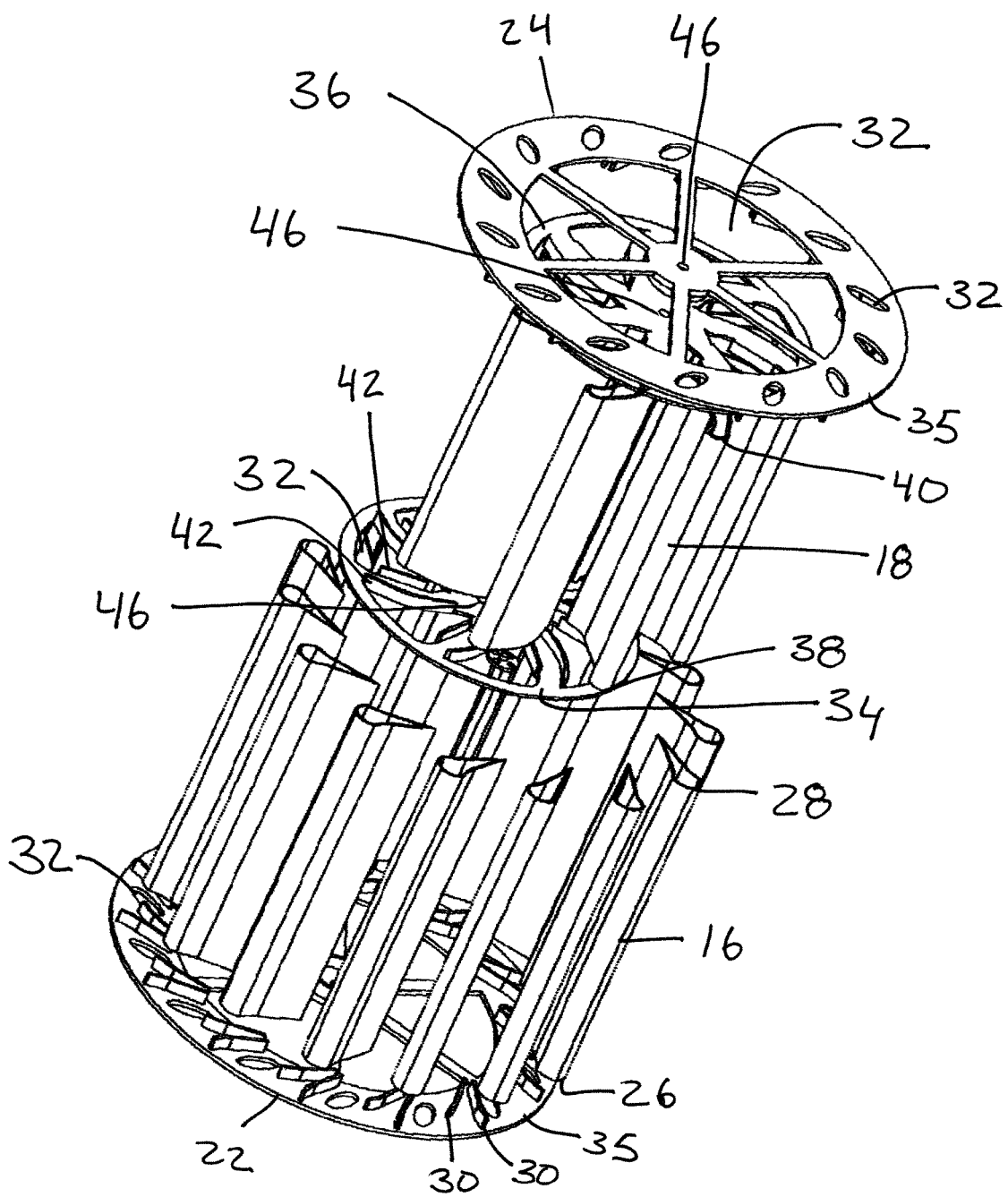
FIG. 3 is an exploded view of a wind turbine according to the present invention.

The present invention is a wind turbine used to convert wind into rotational energy. FIGS. 1-8 show a first embodiment. FIG. 1 shows a perspective top and side view of the wind turbine 10 of the first embodiment. FIG. 2 shows a side exploded view and FIG. 3 shows a perspective exploded view of the wind turbine 10. FIGS. 1-3 show a frame assembly 12 and with a turbine assembly 14 within the frame assembly 12.

The frame assembly 12 is a stationary circular frame that has a multiple of airfoil shaped vanes 16 that take advantage of the Coandă effect, Bernoulli's principle, viscous shear and a resulting creation of a low pressure area. The vanes 16 are vertically mounted and attached to the outer perimeter of frame assembly 12 at an angle. The vanes 16 include a round outer edge with a curved dip just in front of the curved outer semi-circle, to aid in using the Coandă effect, Bernoulli's principle, viscous shear and the resulting creation of a low pressure area. In the center of the frame assembly 12, is the circular turbine assembly 14 that rotates within the frame assembly 12. The turbine assembly 14 includes multiple angled airfoil shaped turbine blades 18 with a specific shape to compress and accelerate the air and direct the air to opposite turbine blades 18 in order to create lift and torque a second time within the turbine assembly 14 before the air exits wind turbine 10 during rotation. The turbine blades 18 can be angled at different angles depending on the number of turbine blades 18, but ideally around 22.5 degrees is the best angle. The air entering into the turbine assembly 14 from the frame assembly 12 passes a turbine blade 18 by moving over the curved surface of the turbine blade 18 creating a low pressure area in front of the turbine blade 18 and creating lift that is imparted to the forward momentum of the turbine blade 18 to create rotation of the turbine assembly 14. The turbine assembly 14 can be connected to a load shaft 20 that spins a load such as a generator.

The frame assembly 12 includes vanes 16, a bottom vane retainer 22 and a top vane retainer 24, as shown in FIGS. 2-3. The vanes 16 include a bottom vane end 26, a top vane end 28. The vanes 16 include an aerodynamic shape vane between the bottom vane end 26 and the top vane end 28. The bottom vane retainer 22 and top vane retainer 24 include vane tabs 30 and weight reduction holes 32. The bottom vane retainer 22 and top vane retainer 24 each have an area about the perimeter that forms a mounting ring 35 from mounting of the vanes 16. FIG. 3 shows a pair of vane tabs 30 on the ring 35 of the bottom vane retainer 22 for each vane 16. Each pair of vane tabs 30 on the bottom vane retainer 22 are shaped to receive the bottom vane end 26 of the vane 16 between the pair of vane tabs 30. The bottom vane end 26 is secured between the pair of vane tabs 30 and hence the bottom vane retainer 22. The top vane retainer 24 is the same as the bottom vane retainer 22 as shown in FIG. 2, where the paired vane tabs 30 of top vane retainer 24 face the paired vane tabs 30 of the bottom vane retainer 22. The top vane end 28 of the vane 16 is secured between a pair of vane tabs 30 of the top vane retainer 24 in the same manner as the vane 16 is secured to the bottom vane retainer 22. A plurality of vanes 16 are secured between the top vane retainer 24 and the bottom vane retainer 22 to form the frame assembly 12.

The turbine assembly 14 includes turbine blades 18, a bottom blade retainer 34 and a top blade retainer 36, as shown in FIGS. 2-3. The turbine blades 18 include a bottom blade end 38, a top blade end 40. The turbine blades 18 include a shaped blade between the bottom blade end 38 and the top blade end 40. The bottom blade retainer 34 and top blade retainer 36 include blade tabs 42 and weight reduction holes 32. The bottom blade retainer 34 and top blade retainer 36 each have an area about the perimeter that forms a mounting ring 44 from mounting of the turbine blades 18. FIG. 3 shows a pair of blade tabs 42 on the bottom blade retainer 34 for each turbine blade 18. Each pair of blade tabs 42 on the bottom blade retainer 34 are shaped to receive the bottom blade end 38 of the turbine blade 18 between the pair of blade tabs 42. The bottom blade end 38 is secured between the pair of blade tabs 42 and hence the bottom blade retainer 34. The top blade retainer 36 is the same as the bottom blade retainer 34 as shown in FIG. 2, where the paired blade tabs 42 of top blade retainer 36 face the paired blade tabs 42 of the bottom blade retainer 34. The top blade end 40 of the turbine blade 18 is secured between a pair of blade tabs 42 of the top blade retainer 36 in the same manner as the turbine blade 18 is secured to the bottom blade retainer 34. A plurality of turbine blades 18 are secured between the top blade retainer 36 and the bottom blade retainer 34 to form the turbine assembly 14. The top vane retainer 24, bottom vane retainer 22, top blade retainer 36 and bottom blade retainer 34 each have a shaft hole 46. FIG. 2 shows a load shaft 48 that mounts in the shaft holes 46. The load shaft 48 is securely attached at the shaft holes 46 of top blade retainer 36 and bottom blade retainer 34 of turbine assembly 14, such that rotation of the turbine assembly 14 rotates the load shaft 48. Shaft bearings 50 are shown that attach to the top vane retainer 24 and bottom vane retainer 22 of the frame assembly 12. The shaft bearings 50 receive the load shaft 48 and allow the load shaft 48 to rotate without the frame assembly 12 rotating.

Figure 4:
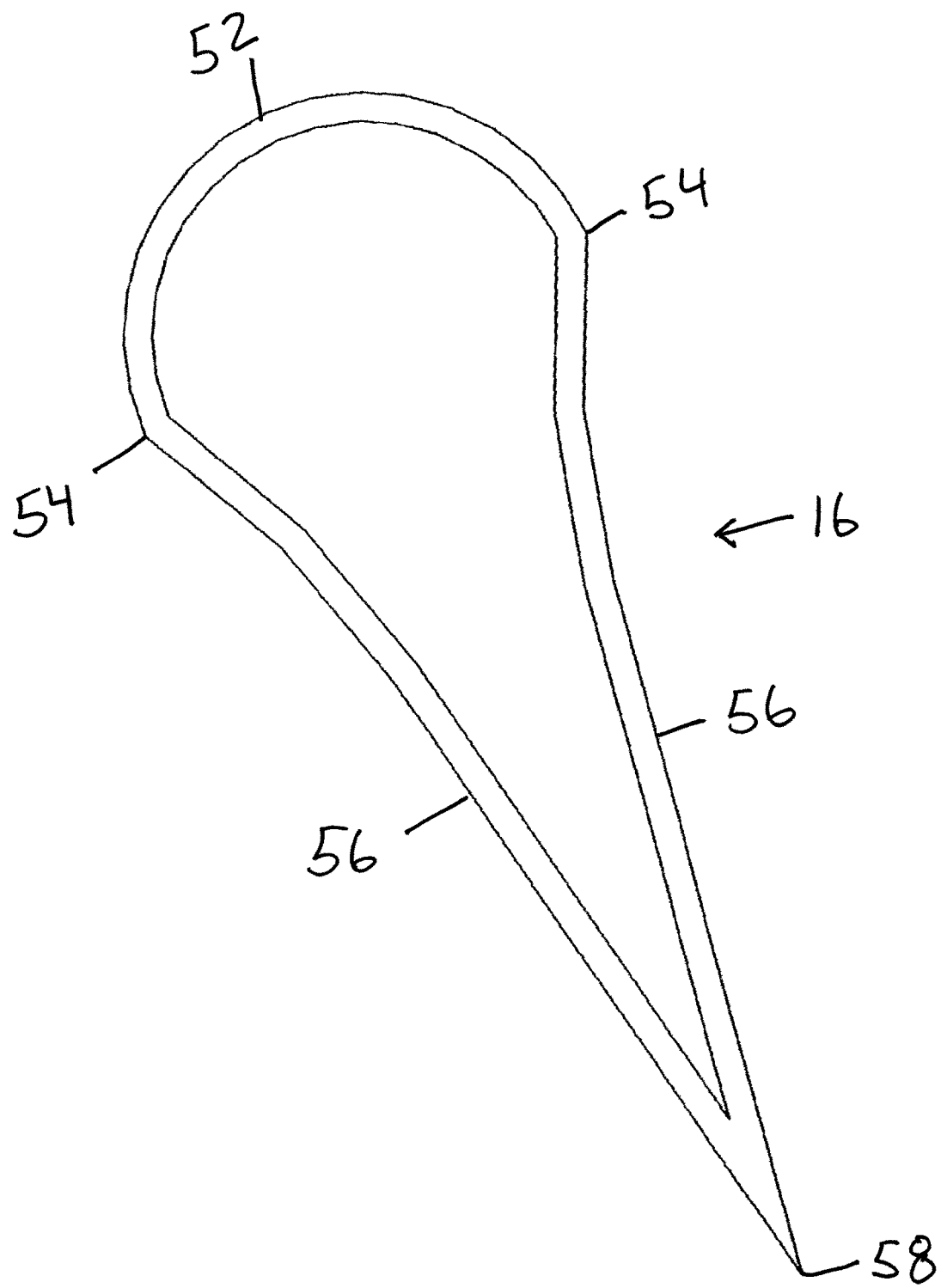
FIG. 4 is an end view of a vane according to the present invention.
Figure 5:
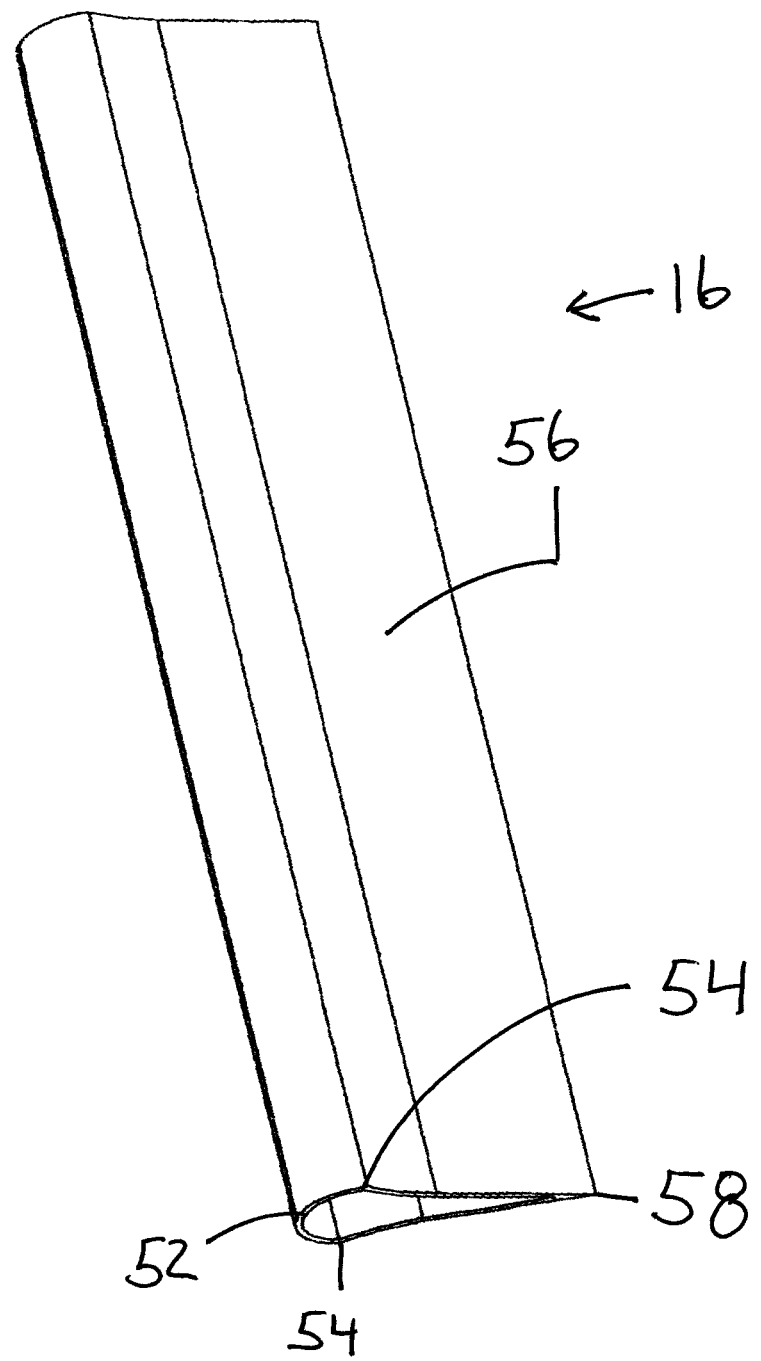
FIG. 5 is a perspective view of a vane according to the present invention.
Figure 6:
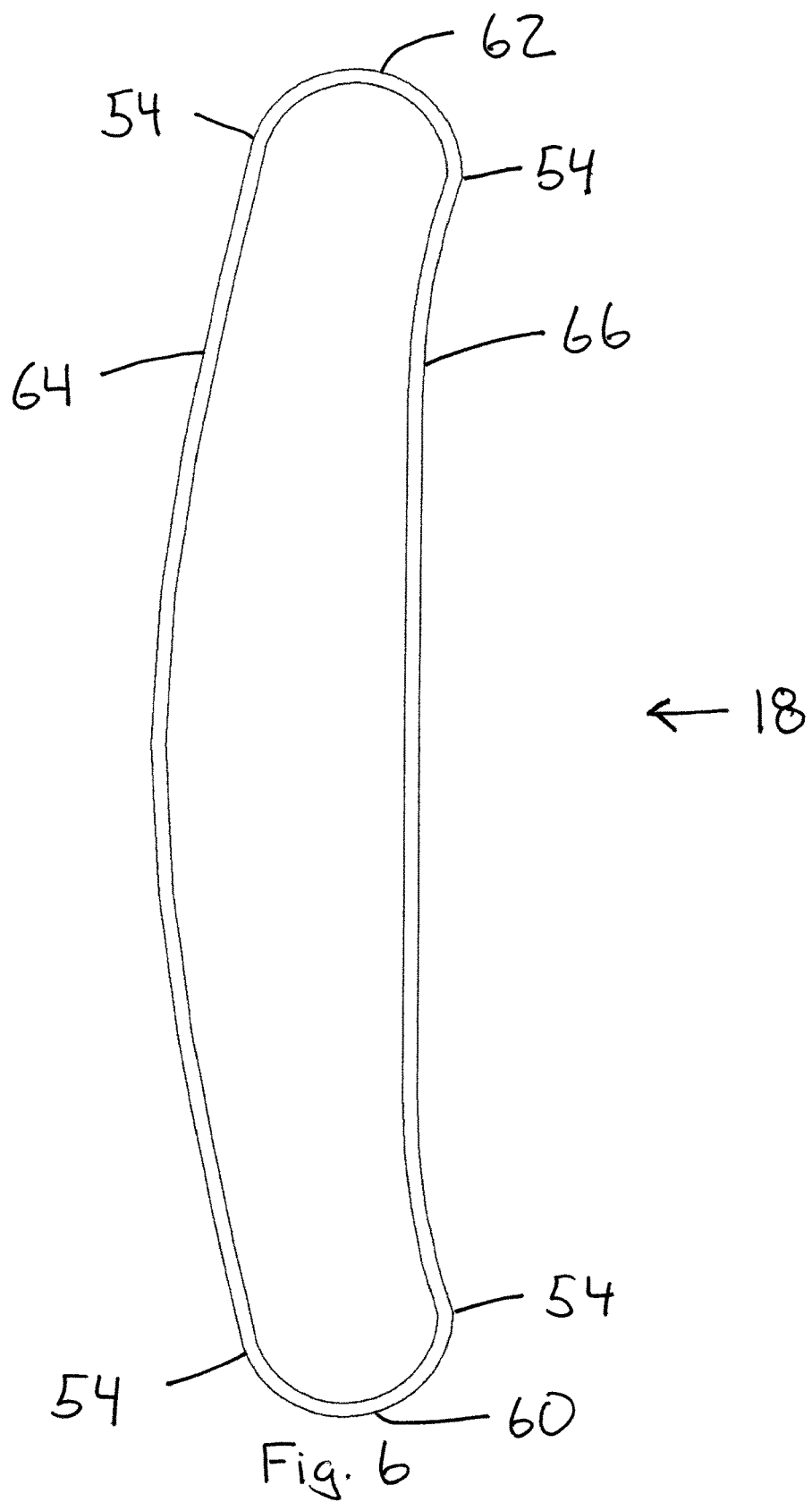
FIG. 6 is an end view of a turbine blade according to the present invention.
Figure 7:
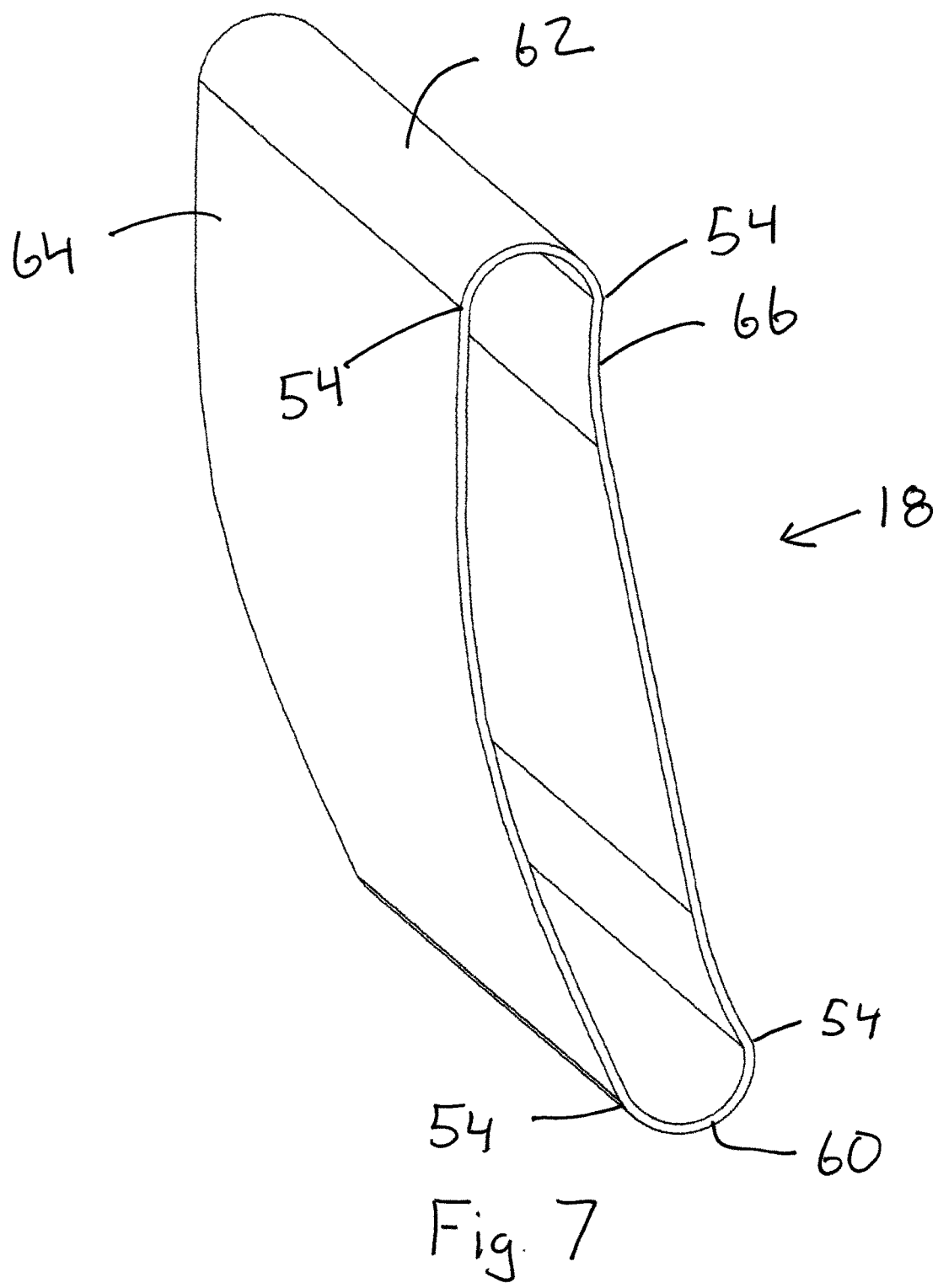
FIG. 7 is a perspective view of a turbine blade according to the present invention.

FIG. 4 shows the profile of the vane 16. FIG. 5 shows a three dimensional view of the vane 16. The profile includes a half circle leading edge 52, where the radius of the half circle leading edge 52 depends on the size of the vane 16. Extending from each end 54 of the half circle leading edge 52 are sides 56 of the vane 16 that come together to form a trailing edge 58. The sides 56 are shown curving inward from ends 54 of the half circle leading edge 52 before making a straight run to form the trailing edge 58. The sides 56 could also extend in a straight line from the ends 54 of the half circle leading edge 52 to form the trailing edge 58. FIG. 6 shows the profile of the turbine blade 18. FIG. 7 shows a three dimensional view of the turbine blade 18. The profile includes a half circle leading edge 60, where the radius of the half circle leading edge 60 depends on the size of the turbine blade 18. The profile includes a half circle trailing edge 62, where the radius of the half circle trailing edge 62 depends on the size of the turbine blade 18. Extending from each end 54 of the leading edge 60 and the trailing edge 62 are a top side 64 and a bottom side 66 of the turbine blade 18. The top side 64 is shown curving outward towards the middle of the top side 64 between the leading edge and the trailing edge. The bottom side 66 is shown curving inward towards the middle of the bottom side 66 between the leading edge 60 and the trailing edge 62 of the turbine blade 18. The top side 64 and the bottom side 66 form an aerodynamic shape between the leading edge 60 and the trailing edge 62 of the turbine blade 18. The top side 64 and the bottom side 66 could also extend in a straight line between the leading edge 60 and the trailing edge 62 of the turbine blade 18.

Figure 8:
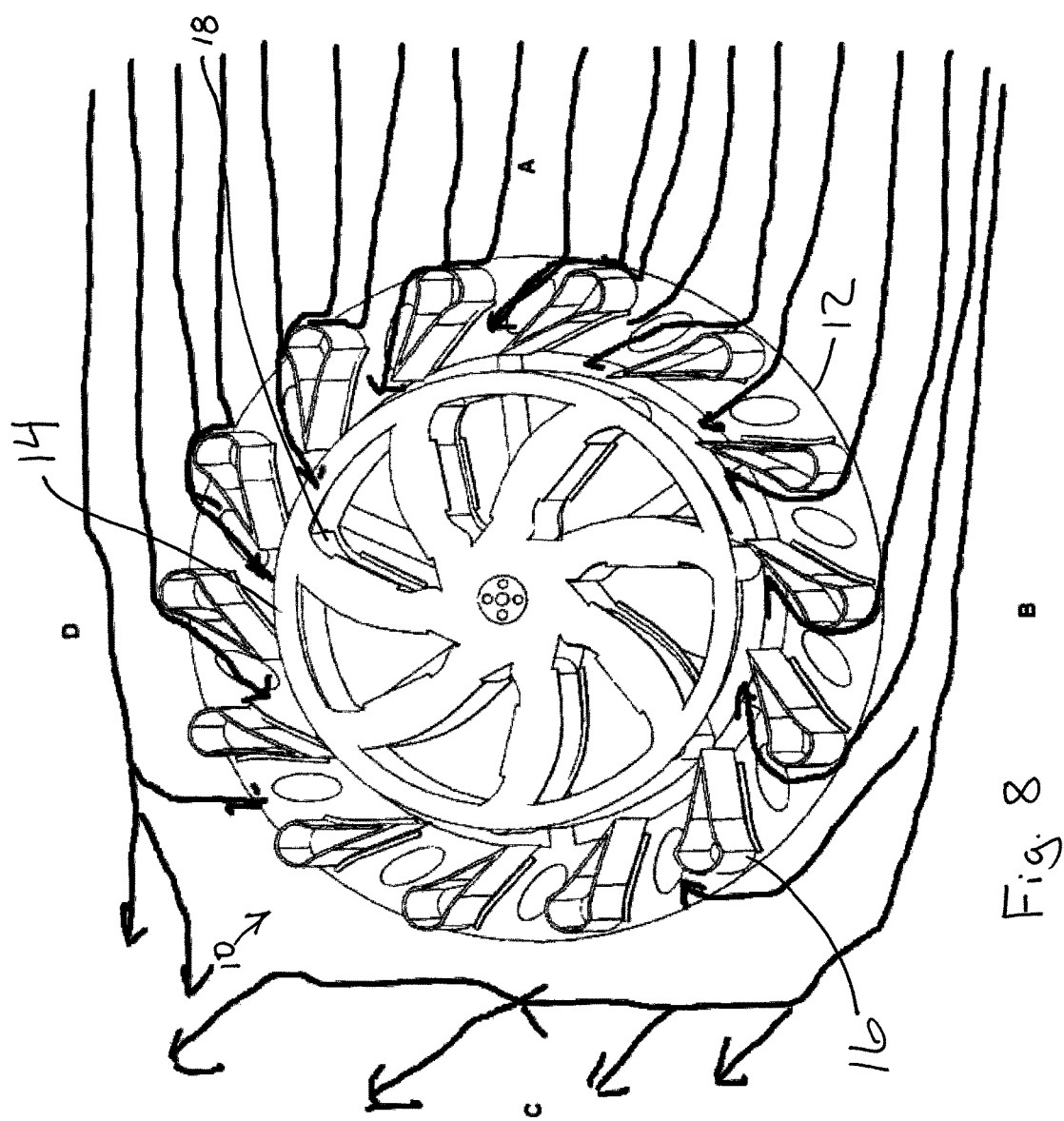
FIG. 8 is a top view of a wind turbine according to the present invention.

FIG. 8 shows the airflow of the wind through the frame assembly 12 and the turbine assembly 14. For discussion purposes, the top vane retainer 24 is removed from the frame assembly 12. FIG. 8 depicts what is believed to happen to airflow of wind as it hits the wind turbine 10 of FIGS. 1-7 from any given direction. It is believed that Coandă effect and Bernoulli's principle pertaining to the acceleration of air are part of what causes the airflow depicted in FIG. 8. FIG. 8 shows the wind turbine 10 in wind coming from direction A. The frame assembly 12 is a stationary circular frame with the fixed vertically mounted vanes 16 arranged around the outer perimeter of the frame assembly 12. The vanes 16 are angled in the frame assembly 12 between 25-40 degrees, depending on diameter of frame assembly 12. Purpose of the frame assembly 12 is to cause the wind coming from any direction to be directed to force forward motion of turbine blades 18 in the direction of rotation of the turbine assembly 14. The frame assembly 12 captures air greater than the width of the frame assembly 12, as shown in FIG. 8. FIG. 8 shows capturing wind along the sides of the frame assembly 12 at points B and D. This happens because the air that is blowing outside the frame assembly 12 is literally sucked in between the vanes 16 on the sides and backside of the frame assembly 12. The acceleration of air towards the vanes 16 in the frame assembly 12 cut through air on the return side B of the circular path. The air flow on side B is converted from being a point of drag on the rotation of the rotating turbine blades 18 of the turbine assembly 14 to a positive force of momentum that aides in creating rotation of the turbine assembly 14 instead of drag by the use of the above listed principals. The singular directional air flow at sections B, A, and D all combine to add to the speed of rotation of the turbine assembly 14. This happens because the air that is blowing outside the frame assembly 12 is flowing in the opposite direction of the turbine blades 18 rotation and travels around the outer perimeter and is then sucked in between the vanes 16 nearest to the return path (junction of C and D) of the forward moving air due to the low pressure area created by accelerating air. This is due to areas of high pressure and low pressure being created by the turbine blades 18. The angle and the placement in the vanes 16 in the frame assembly 12 does not allow for the wind to have a direct negative impact on the turbine blades 18 of the turbine assembly 14 since all air entering is in the direction of the forward rotation of the turbine assembly 14.

The acceleration and change of direction of existing wind to operate the wind turbine 10 is achieved with this design. The wind is redirected toward the forward motion of the turbine assembly 14 with the use of a special aerodynamic shape leading edge creating a positive force in place of the drag created by turbine blades 18 of the turbine assembly 14 spinning into the direction of the wind. The use of this special aerodynamic shape of the half circle leading edge allows for smooth flow of air into and out of the wind turbine 10. As described above, the air flow on the left side of FIG. 8 is converted from a point of drag on the rotation to a positive force of momentum creating rotation instead of drag by the use of the above principals. The entire width and height of the air flow from the wind all combine to add to the forward rotation of the turbine assembly 14. The purpose of the frame assembly 12 is to cause the wind coming from any direction to be directed toward forward motion of turbine blades 18 and eliminate drag and creating a positive force in its place using the Coandă effect, Bernoulli's principle, viscous shear and the resulting creation of a low pressure area. The frame assembly 12 captures air greater than the width of itself using viscous shear. This happens because the air of the wind that is blowing outside the frame assembly 12 is redirected toward the rotation of the turbine blades 18 inside frame assembly 12 and the pulling adjacent air along that would not normally enter prior vertical wind turbine designs. The angle and the placement of the vanes 16 in the frame assembly 12 does not allow for the wind to have a direct negative impact on the spinning turbine blades 18 but instead creates a positive force in place of the drag, since all air entering is in the direction of rotation of the turbine blades 18. It is believed that a prime number of turbine blades 18 is the most effective configuration of turbine blades 18 in the turbine assembly 14.

Figure 9:
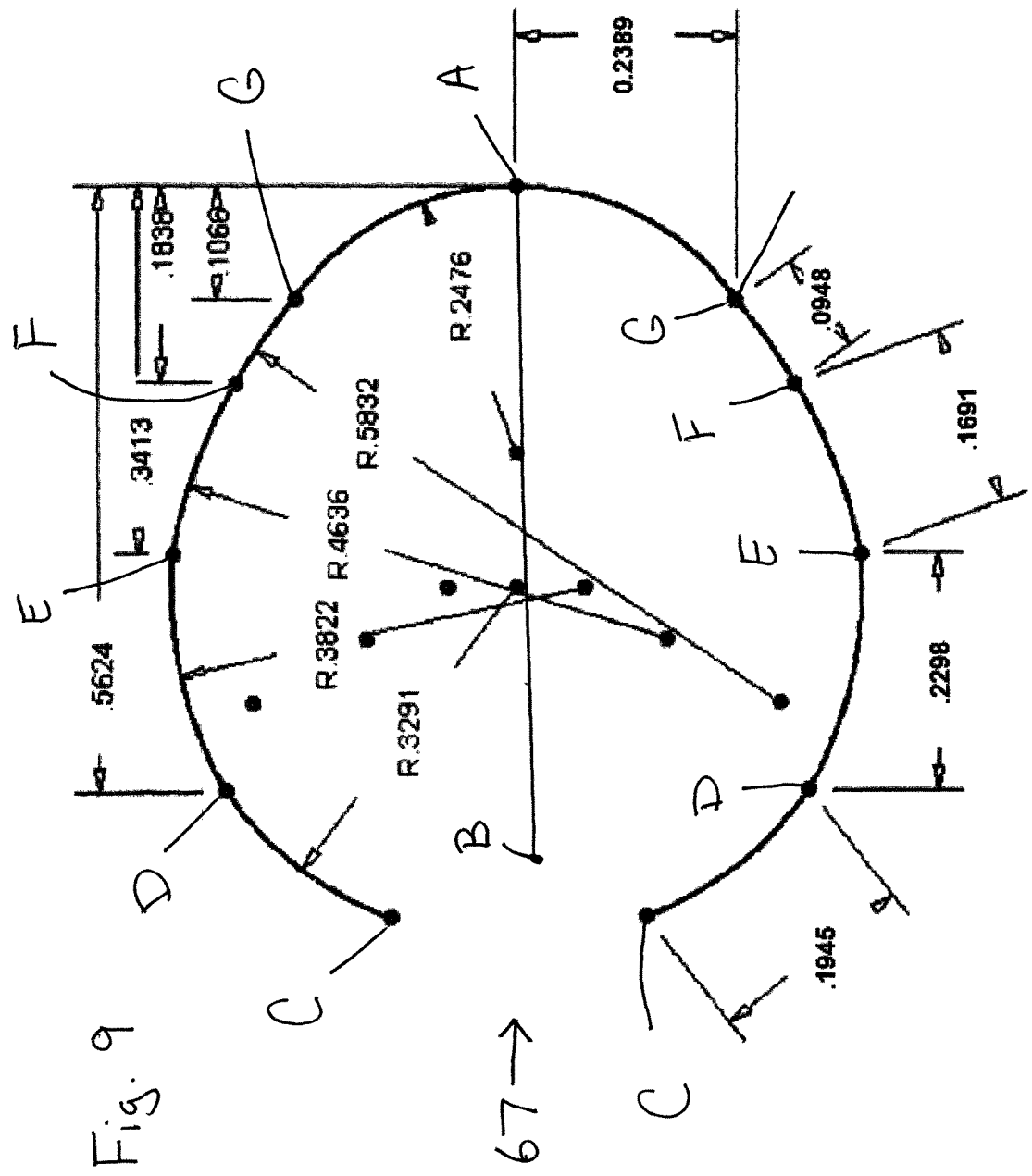
FIG. 9 is a profile view of a clip according to the present invention.
Figure 10:
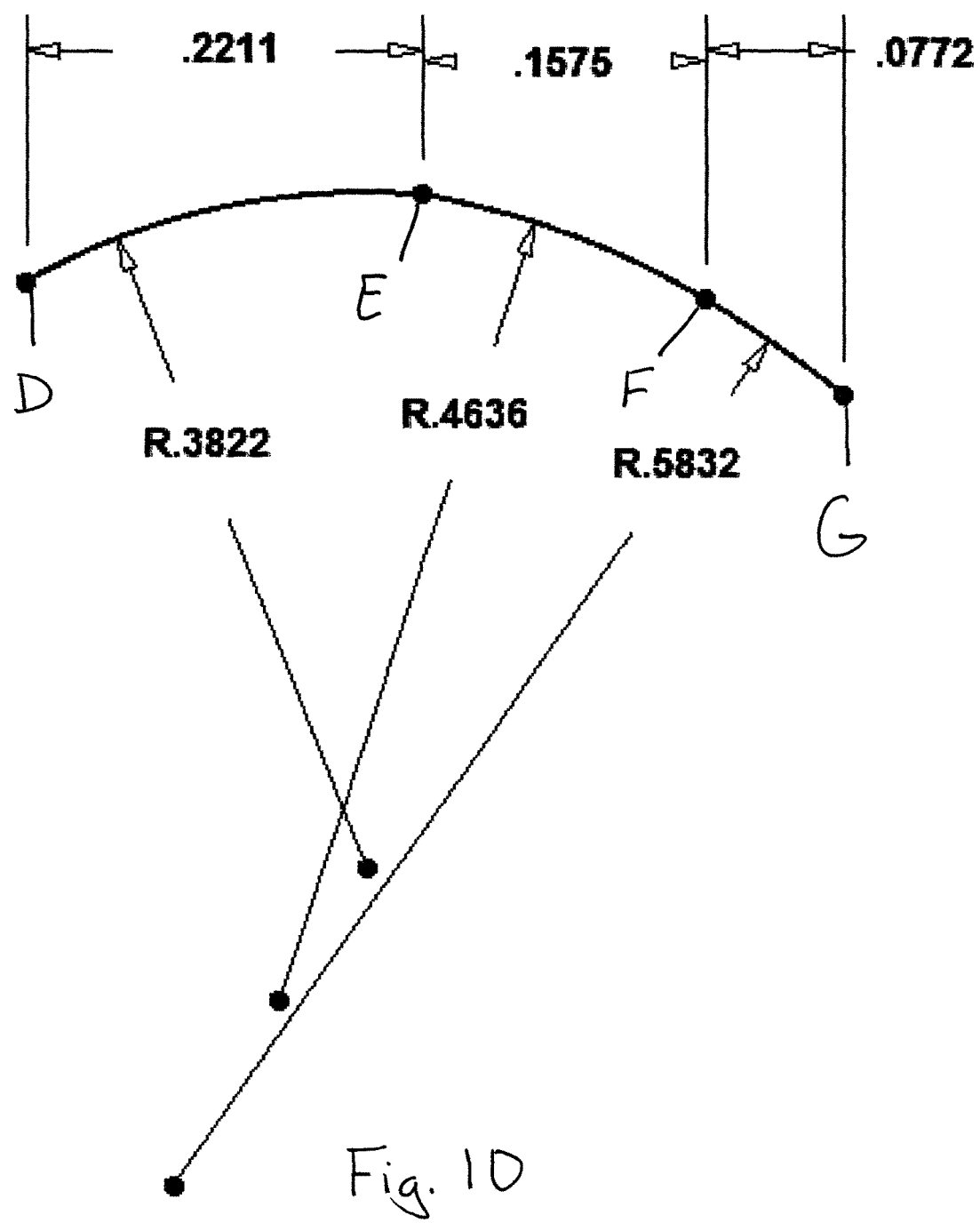
FIG. 10 is a segment view of a clip according to the present invention.

For a second embodiment, a clip of a special fluid dynamic shape was developed to replace the semi-circle leading edges and trailing edges of the first embodiment. The clip is shown in FIG. 9 and has proven to be useful as a leading edge and trailing edge for many devices that employ fluid dynamics. In experiments, the clip was used as an aerodynamic edge on aerodynamic shapes such as airfoils. In the experiments, the clip has proven to increase lift on the shape at lower air velocities, but the clip can also be used to improve any fluid flow over a shape. The clip can be added to a blade that has a flat bar shape to almost any shaped blade that employs techniques to enhance fluid flow over a shape. FIG. 9 shows the dimensions of the outside surface of a clip for use with a wind turbine having a frame assembly diameter in the range of 12 inches to 48 inches and turbine assembly diameter in the range of 8 inches to 36 inches. The clip is symmetric about a line through points A and B and is shown to be made up of five arcs. FIG. 10 shows an enlarged view between points D and G. Between points A and G, is an arc having a radius of 0.2476 inches and an arc length of 0.23895. Between points G and F, is an arc having a radius of 0.5832 inches and an arc length of 0.0948 inches. Between points F and E, is an arc having a radius of 0.4636 inches and an arc length of 0.1691 inches. Between points E and D, is an arc having a radius of 0.3822 inches and an arc length of 0.2298 inches. Between points D and C, is an arc having a radius of 0.3291 inches and an arc length of 0.1945 inches. FIG. 9 also shows distance between points from a datum at point A and distance between points G with A as the midpoint. FIG. 10 shows the distance between points G, F, E and D. The arc between G and A for both sides forms a nose end. The outside surface of the clip can be enlarged or reduced in size by scaling the size of the arc radius and arc length of each arc between the points by applying the same percentage of change to each arc.

Figure 11:
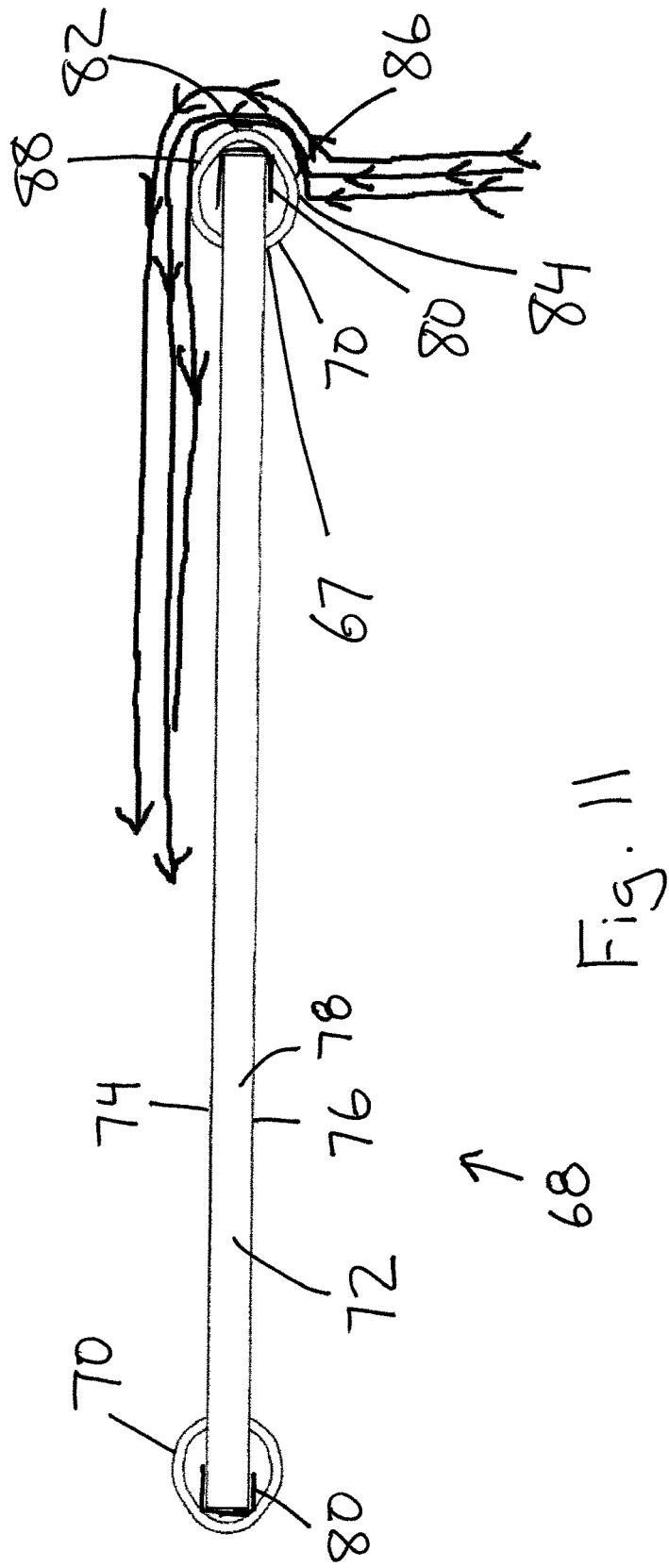
FIG. 11 is a top view of a flat blade assembly with clip according to the present invention.

The opening at the blade end 67 of the clip between points C in FIG. 9 is for receiving a blade or other fluid dynamic shape. FIG. 11 shows a flat blade assembly 68 of two clips 70 on each end of a flat blade 72. The flat blade includes side 74, side 76 and thickness 78. A blade used with the clip can be of any thickness, but there is a requirement that point C of FIG. 9 connects to the sides of the blade in a way such that there is no opening between points C and the sides of the blade. This requirement is for keeping the flow off of the clip separated from other airflow, which causes the air to be drawn around the one side more than the other of the clip and hence the flat blade assembly 68. This requirement is not only subject to flat blades, but all blade profiles that incorporate the use of the clip. Therefore, the distance between points C of the clip will vary depending on the thickness of the flat blade. If it is desired to use a blade of a thickness that is less than the opening of the blade end 67 of any particular sized clip, a gap filler can be used between points C and the sides of the blade. An example of a gap filler is a straight wall of material between points C and the sides of the blade. The clip can be applied to many applications that involve fluid dynamics, where the second embodiment will be one example of the application of the clip. Each clip includes a blade channel 80 inside the clip to hold the blade 72 and clip 70 in position together, as shown in FIG. 11. FIG. 11 shows the behavior of fluid flow from the wind, where the air directed at almost 90 degrees from the nose 82 of the clip 70 at point 84 versus wind that has direct impingement on the nose 82. The air flow from the wind is directed about side 86 and nose 82 of the clip 70 and then flows about the other side 88 of the clip 70. The airflow then follows side 74 of the flat blade 72 towards the other clip 70 for exiting pass the flat blade assembly 68. The unique feature of the flat blade assembly 68 using the clip 70 is how the air is captured in the area about the side 86 and nose 82 of the clip 70 and then forced along the flat blade assembly 68.

Figure 12:
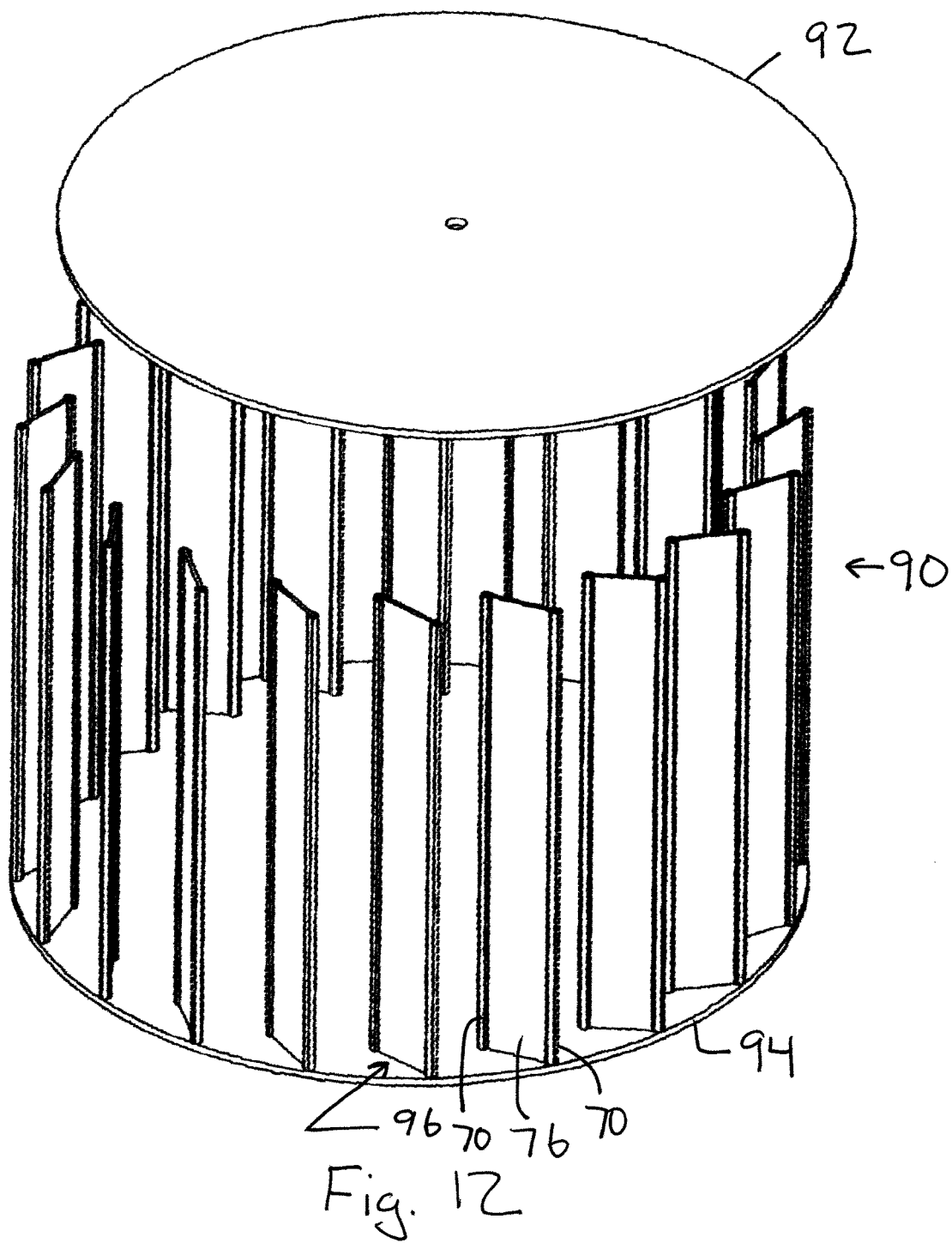
FIG. 12 is a perspective view of a frame assembly according to the present invention.
Figure 13:
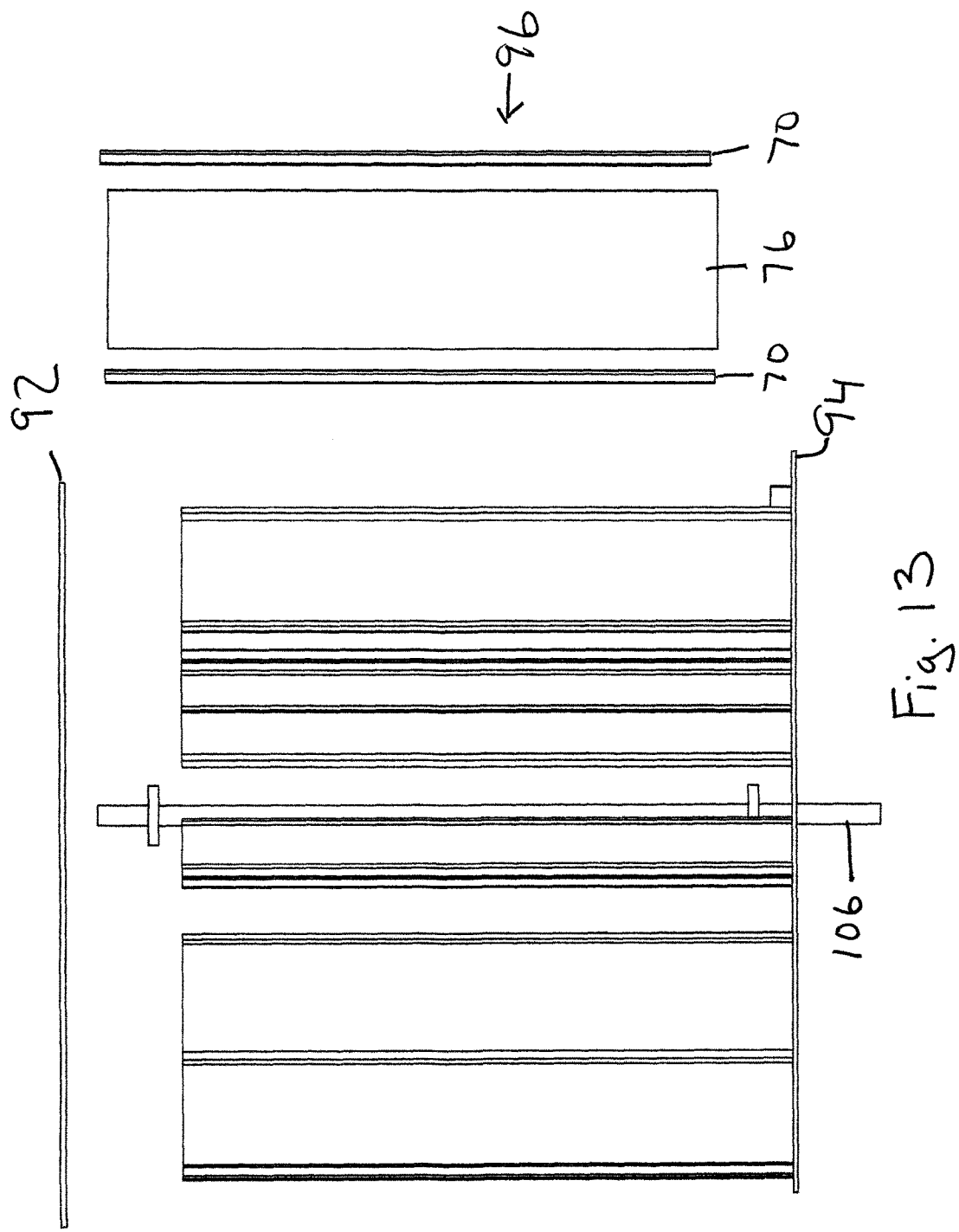
FIG. 13 is an exploded view of a frame assembly according to the present invention.
Figure 14:
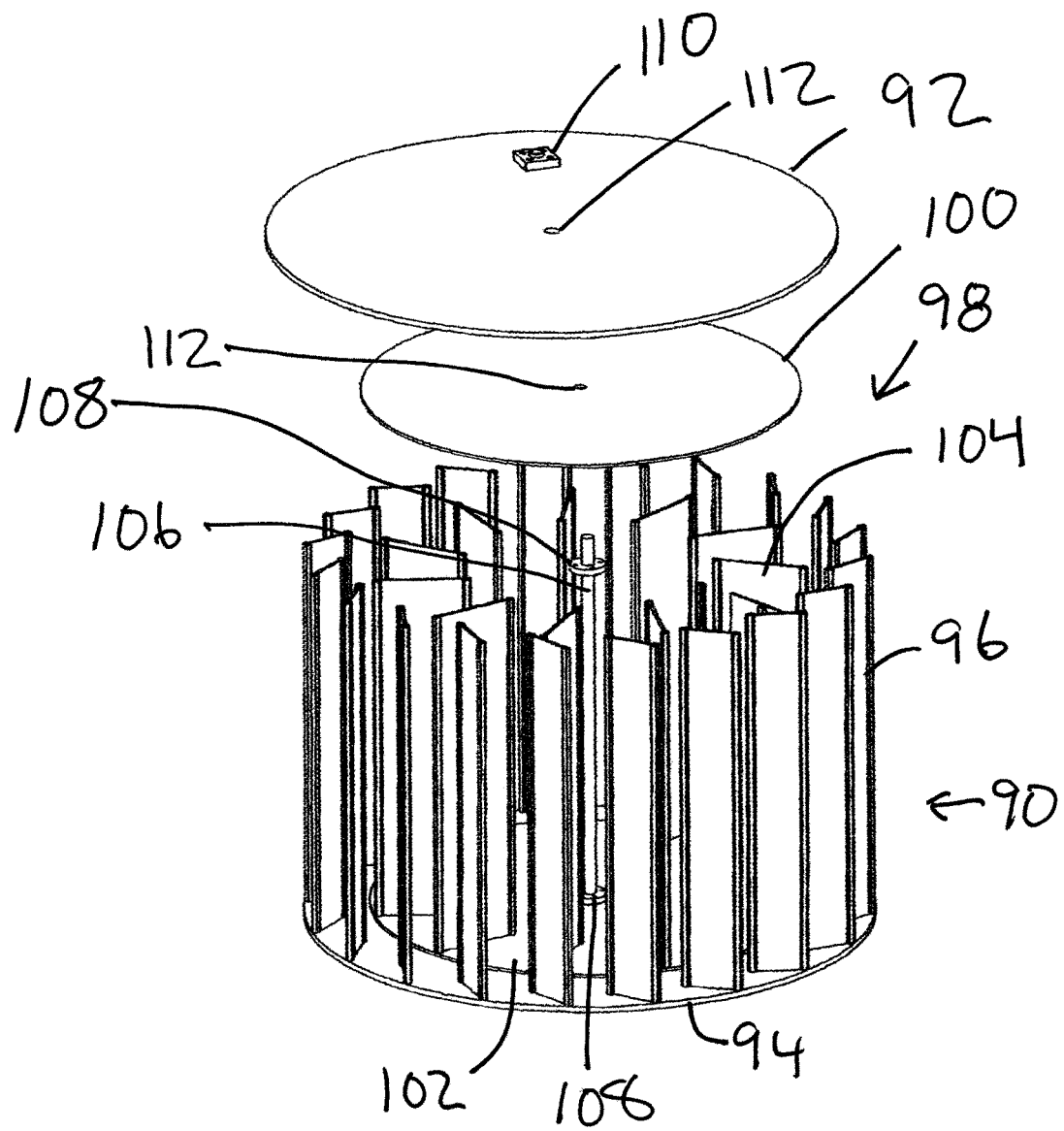
FIG. 14 is a perspective view of a turbine assembly in a frame assembly according to the present invention.

FIGS. 12-13 shows a frame assembly 90 of the second embodiment with a top vane retainer 92, bottom vane retainer 94 and using the flat blade assembly 68 of FIG. 11 for the vanes 96. FIG. 14 shows a turbine assembly 98 within the frame assembly 90 of FIGS. 12-13. The turbine assembly 98 is shown with a top blade retainer 100, bottom blade retainer 102 and using the flat blade assembly 68 of FIG. 11 for the turbine blades 104. FIGS. 13-14 also show a load shaft 106 for connecting to a load. FIG. 14 shows shaft mounts 108 attached to the top blade retainer 100 and bottom blade retainer 102 to secure the load shaft 106 so that the load shaft 106 rotates with the turbine assembly 98 during turbine assembly 98 rotation. FIG. 14 shows a shaft bearing 110 which mounts to the outside surface of the top vane retainer 92 to receive the load shaft 106. The outside surface of the bottom vane retainer 94 would also have a shaft bearing 110, but is not shown. The top vane retainer 92, bottom vane retainer 94, top blade retainer 100 and bottom blade retainer 102 all have a shaft hole 112 similar to the first embodiment to allow passage of the load shaft 106. The shaft bearings 110 allow the load shaft 106 to rotate within the frame assembly 90, as the frame assembly 90 is stationary. The vanes 96 and turbine blades 104 can be mounted in various ways, including using the modern technology of printing the frame assembly 90 and turbine assembly 98 each as one piece with a 3-D printing device.

Figure 15:
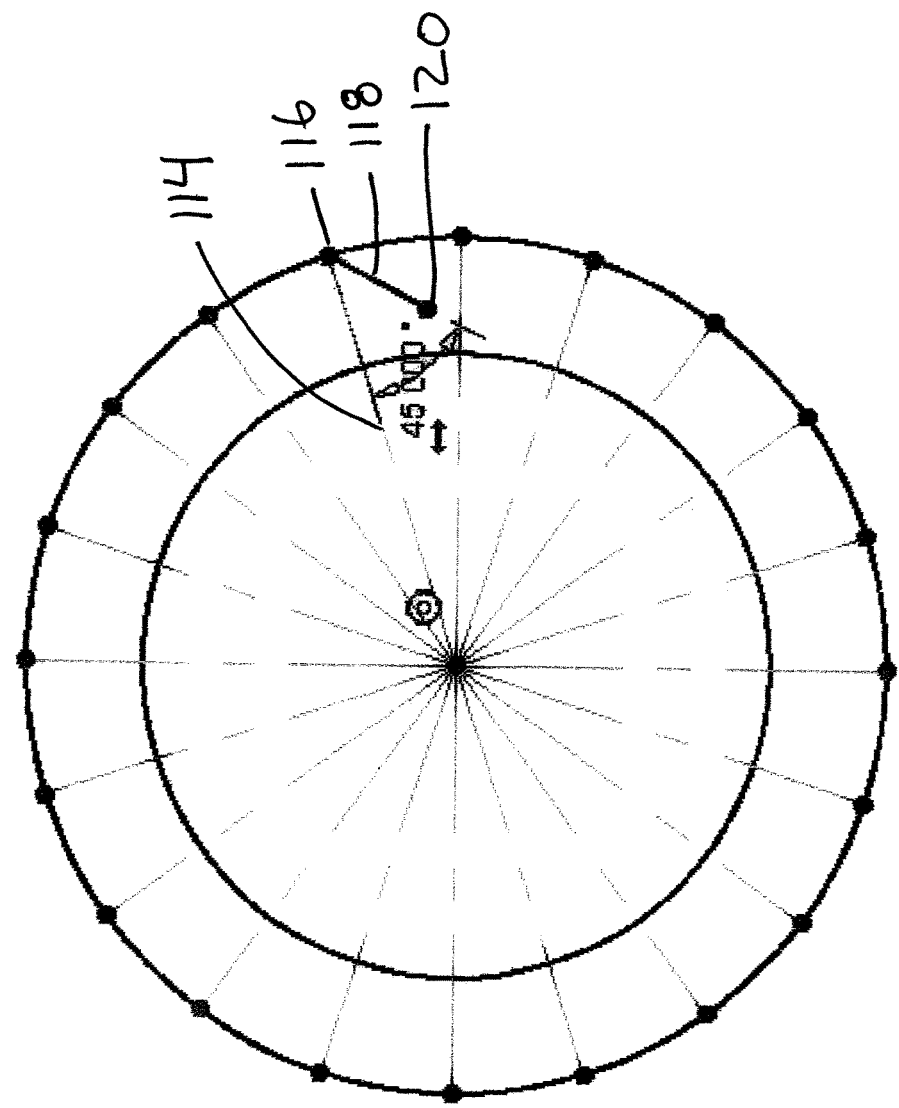
FIG. 15 is a schematic view of a vane position according to the present invention.
Figure 16:
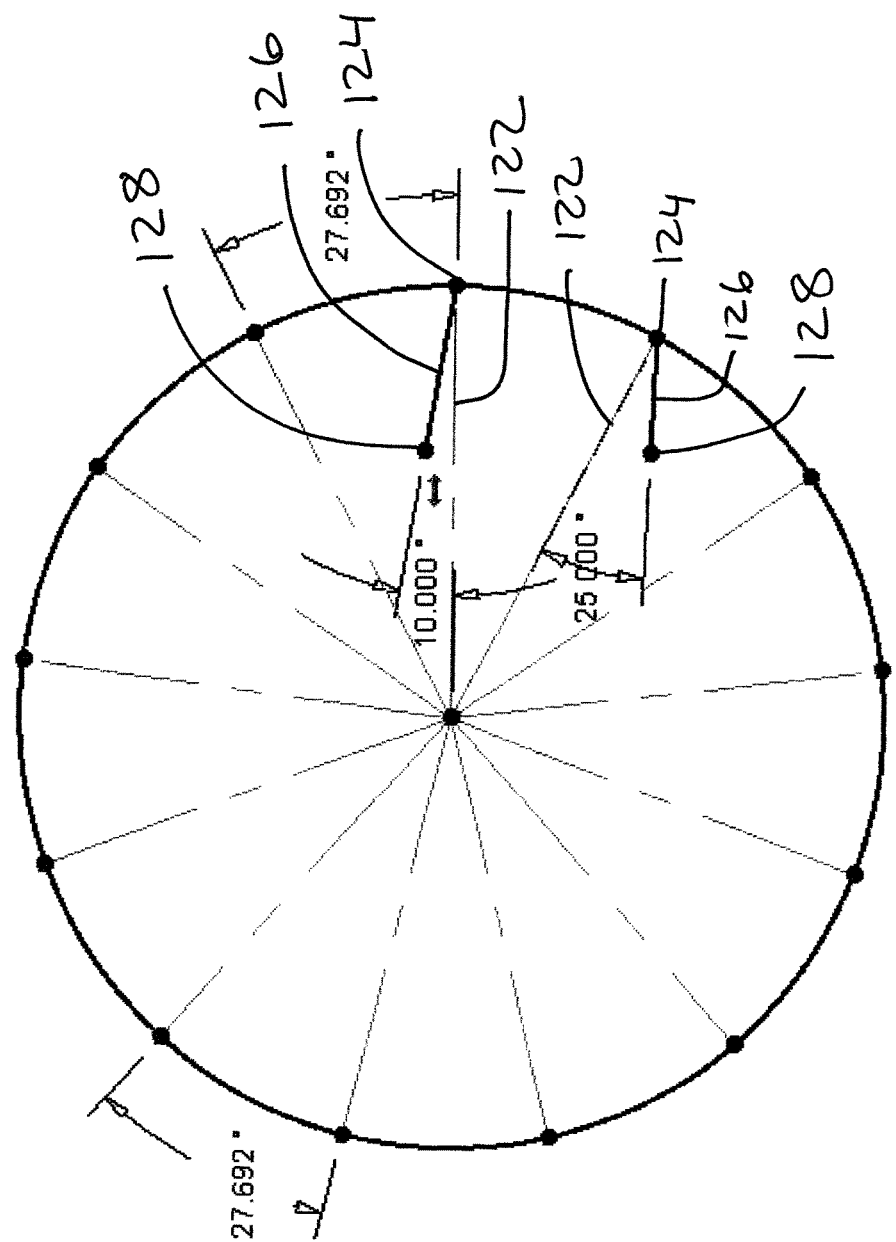
FIG. 16 is a schematic view of a blade position according to the present invention.

FIG. 15 shows how to define positioning of the vanes which can be applied to both embodiments. FIG. 15 shows an imagery line drawn 114 from the center of the frame assembly to the leading edge clip 116 of the flat blade assembly 118 used for the vanes. An angle of 45 degrees is formed between the flat blade assembly 118 and the imagery line 114 due to the position of the trailing edge clip 120 of the flat blade assembly 118. A counter clockwise rotation of the trailing edge clip 120 from the imagery line 114 is considered positive angle and a clockwise rotation (not shown) from the imagery line 114 is considered a negative angle. A flat blade assembly position of a vane that has a positive angle produces the turbine assembly rotation in the clockwise direction and a position of a vane that has a negative angle produces the turbine assembly rotation in the counter clockwise direction. A flat blade assembly position for the vanes of 35 to 50 degrees of angle in the positive or negative direction works well and an angle of +/−45 degrees appears to be optimal in limited testing. FIG. 16 shows how to define positioning of the turbine blades. FIG. 16 shows an imagery line 122 drawn from the center of the turbine assembly to the leading edge clip 124 of the flat blade assembly 126 used for the turbine blades. A positive angle of 25 degrees formed between the flat blade assembly 126 and the imagery line 122 due to the position of the trailing edge clip 128 of the flat blade assembly 126 used as a turbine blade is shown in FIG. 16. A counter clockwise rotation of the trailing edge clip 128 from the imagery line 122 is considered positive angle and a clockwise rotation is considered a negative angle. FIG. 16, also shows a negative angle of 10 degrees formed between the flat blade assembly 126 and the imagery line 122 due to the position of the trailing edge clip 128 of the flat blade assembly 126 used as a turbine blade. A flat blade assembly position for the turbine blades of −20 degrees to +25 degrees of angle works well. An angle of −10 degrees appears to be optimal in limited testing. The angles show are for a turbine assembly that rotates in the clockwise direction. The angles would be reversed for a turbine assembly designed to rotate in the counter clockwise direction, where +20 degrees to −25 degrees of angle would work well and +10 degrees of angle would be optimal.

Figure 17:
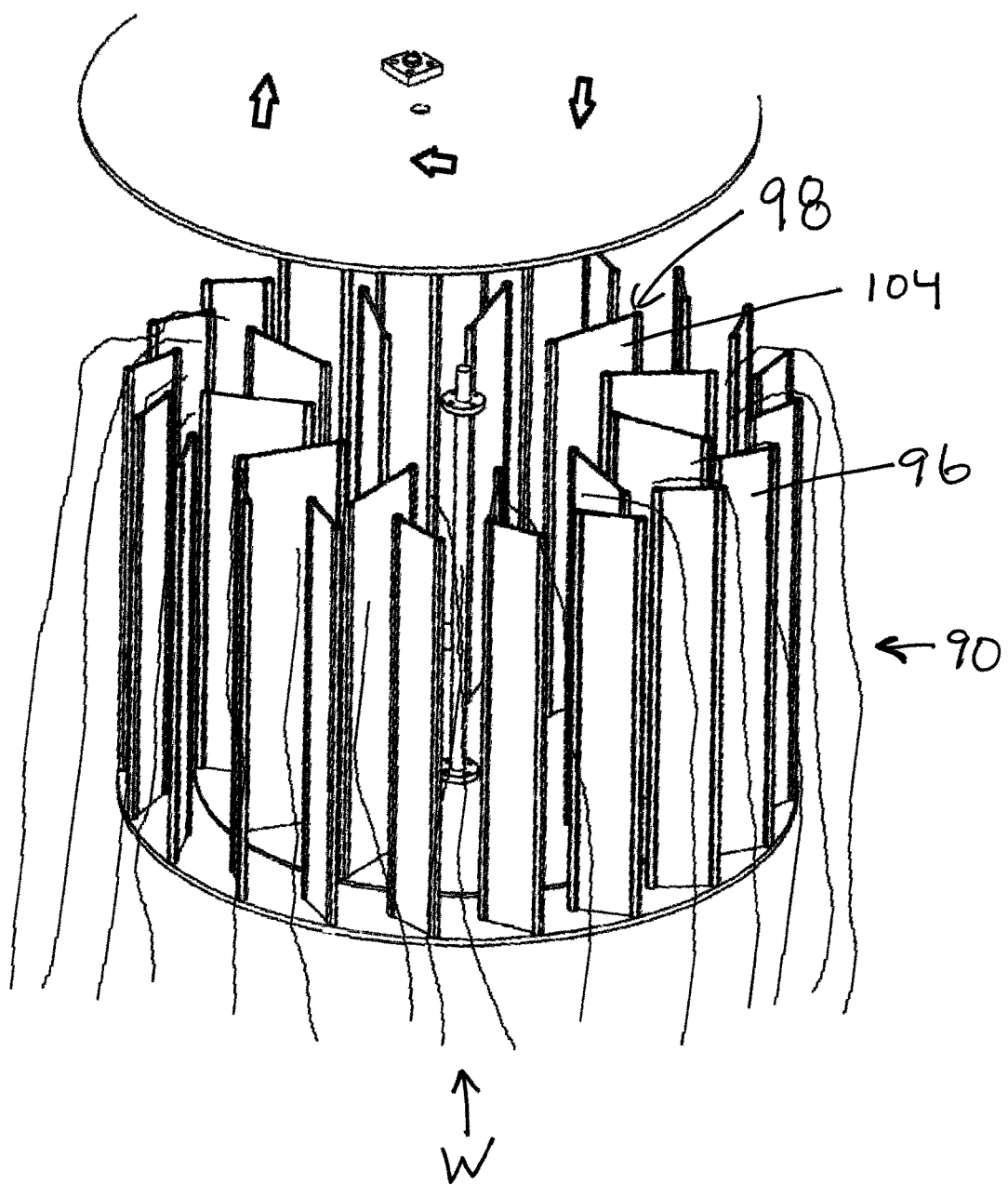
FIG. 17 is a perspective view of a wind flow about a wind turbine according to the present invention.
Figure 18:
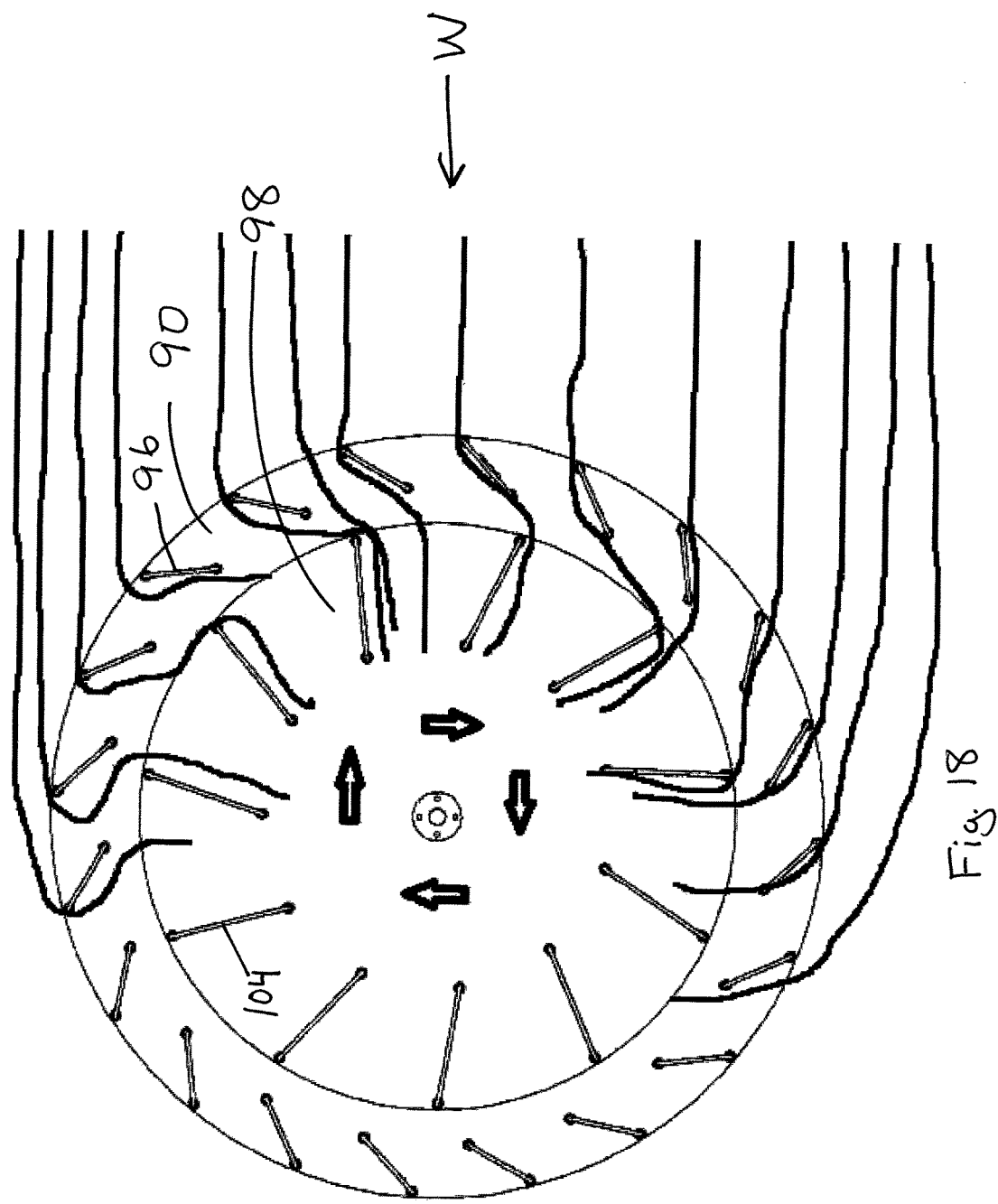
FIG. 18 is a top view of a wind flow about a wind turbine according to the present invention.

FIGS. 17-18 show airflow from a wind direction W flowing about and through the wind turbine of the second embodiment. For the wind turbine of FIGS. 17-18, the turbine assembly 98 rotates in a clockwise direction when viewed from the top vane retainer 92. The clockwise rotation is due the positioning of the vanes 96 in the frame assembly 90, as described for FIGS. 15-16. FIGS. 17-18 show the collection of wind thru the frame assembly 90 from not only direct impingement from the wind at point W, but collection of wind on the sides of the frame assembly 90 by the wind turbine for used to turn the turbine blades 104. The capture and use of the wind in the second embodiment is the same theory as described above in FIG. 8 for the first embodiment.

Figure 19:
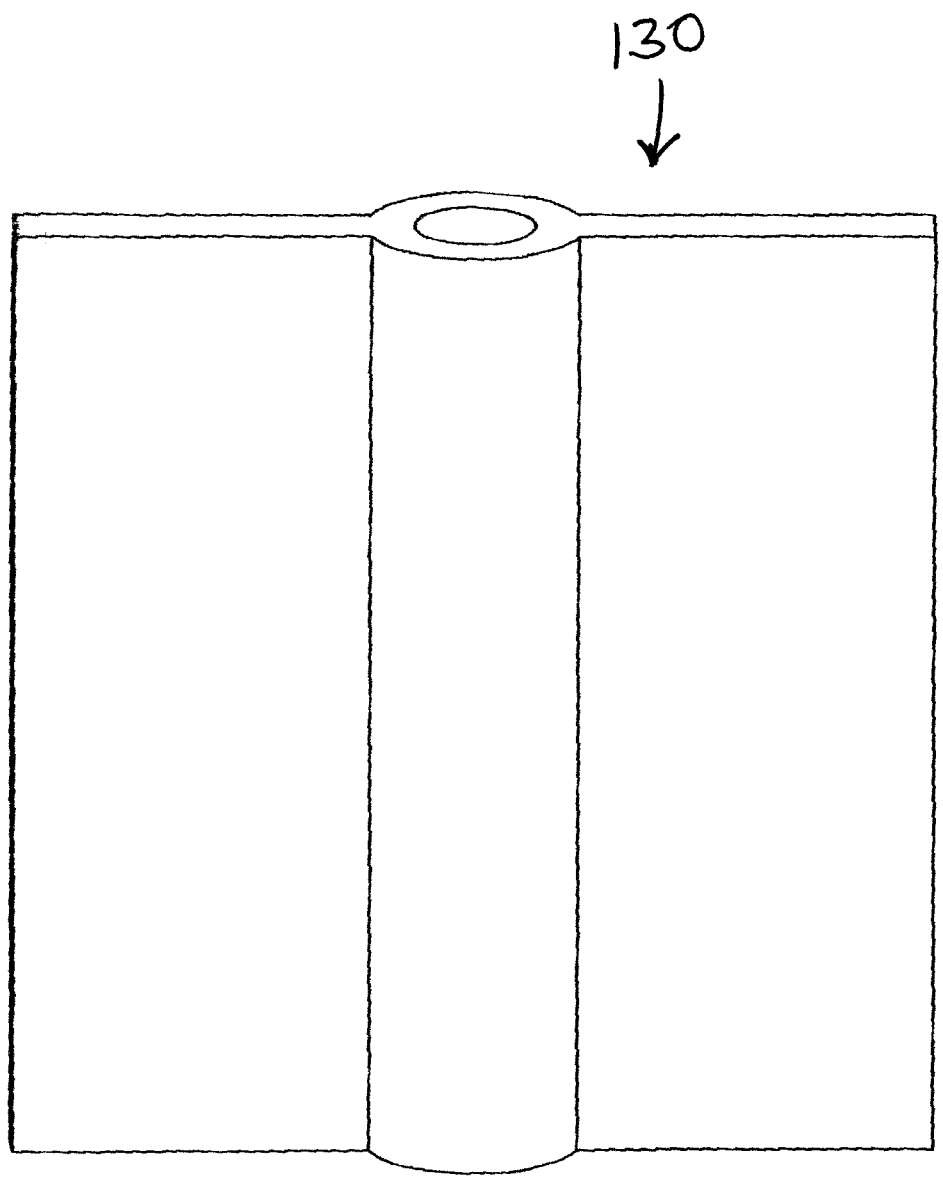
FIG. 19 is a perspective view of a two flat blade assembly according to the present invention.
Figure 20:
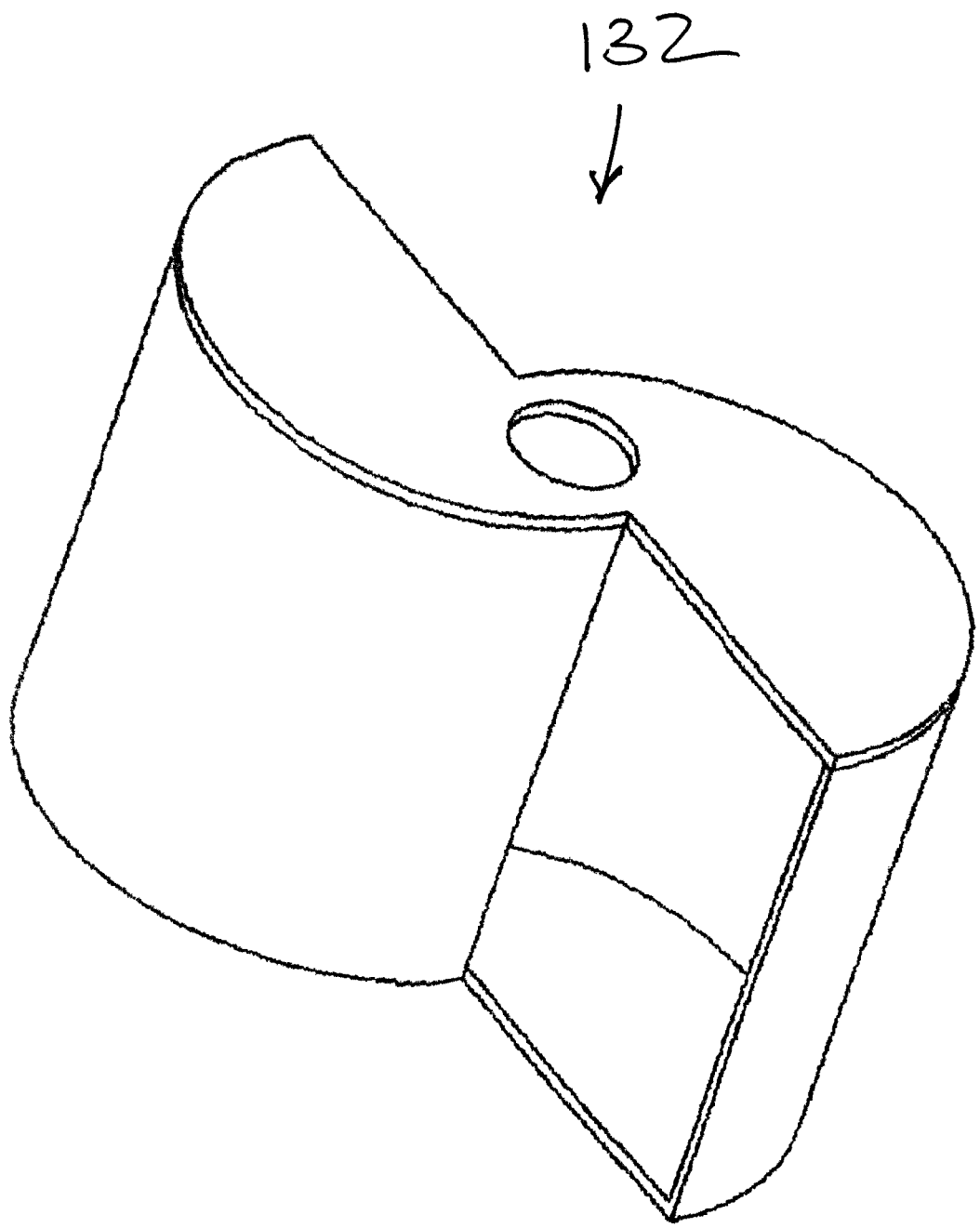
FIG. 20 is a perspective view of a Savonius scoop blade assembly according to the present invention.
Figure 21:
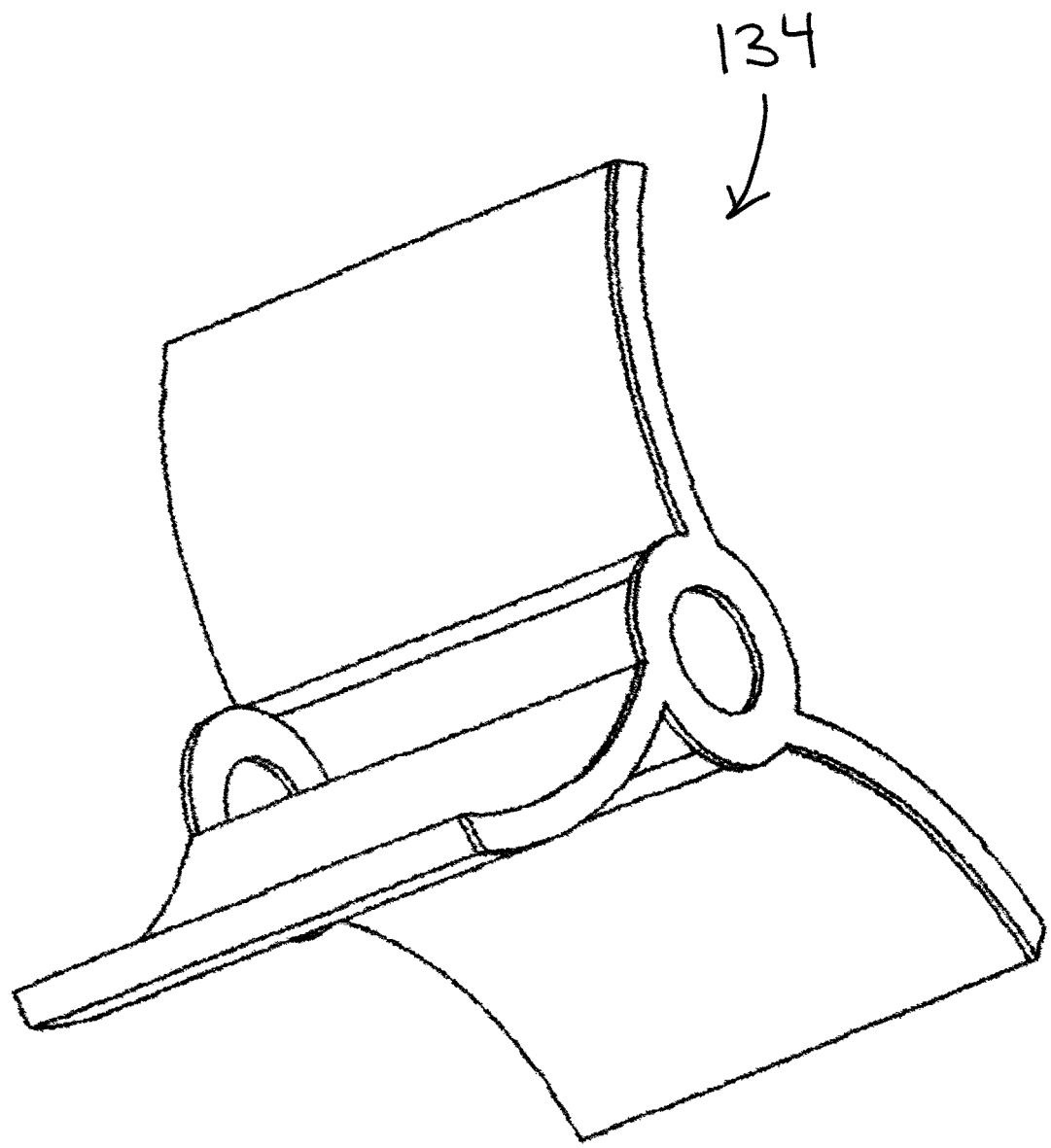
FIG. 21 is a perspective view of a three curved blade assembly according to the present invention.
Figure 22:
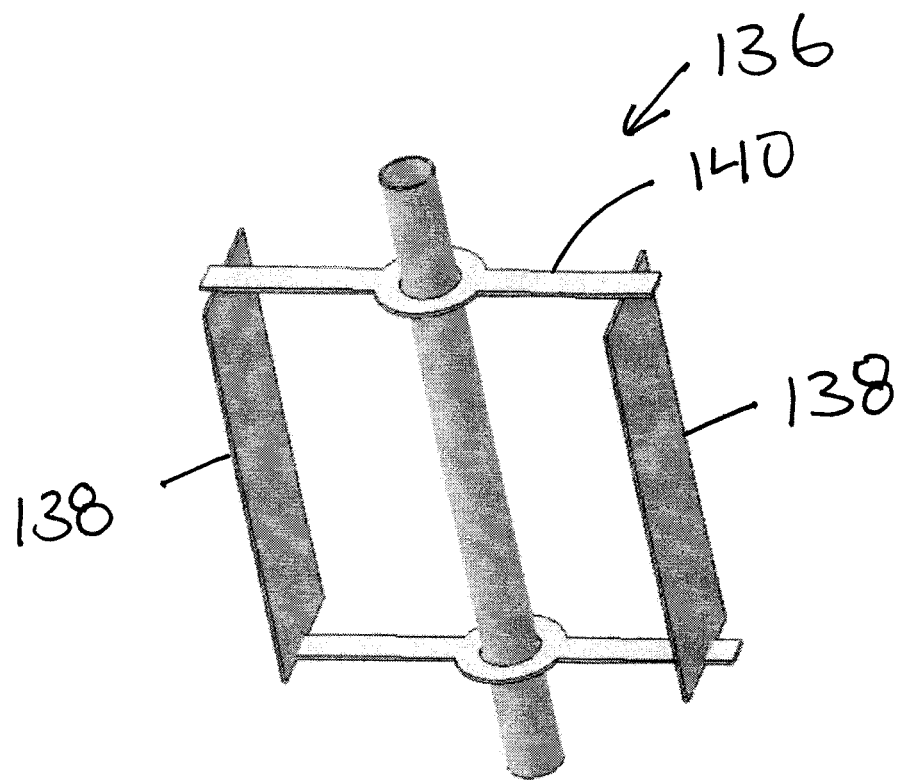
FIG. 22 is a perspective view of a two flat blade assembly without clip according to the present invention.
Figure 23:
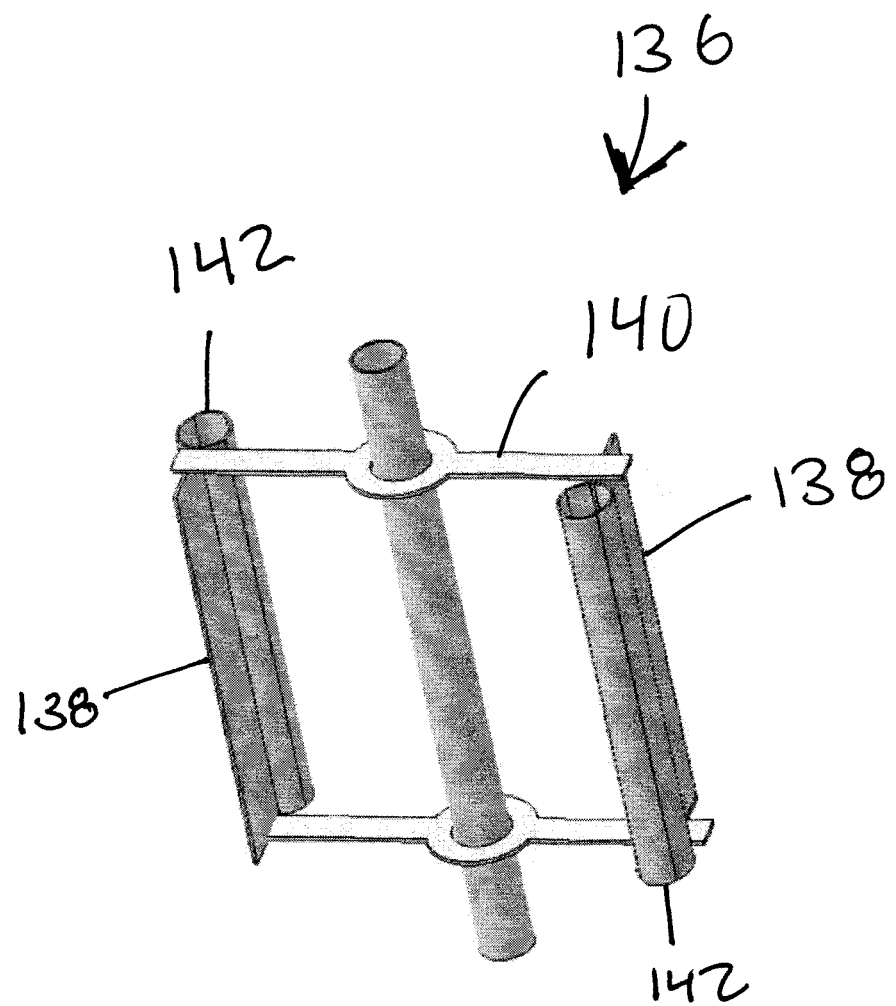
FIG. 23 is a perspective view of a two flat blade assembly with clip according to the present invention.

Tests were performed on a wind turbine of the second embodiment. The wind turbine had a frame assembly with a 48 inch diameter and a height of 28 inches. The vanes were 5 inches wide and there were 20 vanes on the frame assembly. The turbine assembly had a 36 inch diameter and 13 turbine blades that were 8 inches wide. Measured at the shaft was a production of 21 lb ft of torque at 91 rpm for a 6.5 m/s wind speed. This model was designed to produce a high torque for a low rpm generator. It was found that a reduction in vanes in the frame assembly will increase rpm but lower torque at the load shaft for the same size frame assembly and turbine assembly and an increase in vanes has the opposite effect on torque and rpm at the shaft. Using scale models 6 inches high and a 12 inch frame assembly diameter the following results were achieved. Testing was done with a two flat blade assembly 130 that was 5.5 inches wide and 6 inches high and affixed to a center shaft straight across from each other, as shown in FIG. 19. A wind speed was 10 mph was used and there was no movement attained. The next test with the same blade assembly 130 was to place them inside the frame assembly of second embodiment and use the same 10 mph wind, where the blades spun 430 rpm. This shows the positive effect of the frame assembly to turn the air flow and create a one way flow of air inside the frame assembly and eliminate the drag on the blade spinning into the direction of the wind. A second test was done the same way using a Savonius two scoop design blade assembly 132 with 5.5 inch diameter and 6 inches high shown in FIG. 20 without the frame assembly, where the blade assembly 132 achieved 392 rpm in the 10 mph wind. When the blade assembly 132 was placed inside the frame assembly, the blade assembly 132 achieved 507 rpm in the 10 mph wind. FIG. 21 shows a three curved blade assembly 134 of 5.5 inches in diameter and 6 inches high. Without the frame assembly, the blade assembly 134 achieved 128 rpm in the 10 mph wind. When the blade assembly 134 was placed inside the frame assembly, a 328 rpm was achieved in the 10 mph wind. These tests show that the frame assembly with the design of the clip enhances the rotation of blades inside the frame assembly by the collection of more wind about the frame assembly versus only allowing direct impingement of the wind on such blade designs. FIG. 22 shows a two flat blade assembly 136, which includes two flat blades 138 and a spindle 140. The flat blade assembly 136 was 5.5 inches in diameter and 6 inches high. When a 10 mph wind speed was applied, there was no movement caused by the simulated wind. FIG. 23 shows the clip 142 in scale added to each flat blade 138 of FIG. 22. When a 10 mph wind speed was applied, the spindle 140 rotated at 370 rpm. This shows that the addition of the clip 142 can cause rotation and lift due the aerodynamic shape of the clip 142.

As a third embodiment, a range of dimensions for the five arcs was created for the clip of FIGS. 9 and 10, whereby the clip will still be useful as a special fluid dynamic shape, but just not as efficient. For the arc between points A and G, the maximum arc radius is 0.35080 inches and maximum arc length is 0.23895 inches and the minimum arc radius is 0.24760 inches and minimum length is 0.23895 inches. For the arc between points G and F, the maximum arc radius is 0.35080 inches and maximum arc length is 0.09480 inches and the minimum arc radius is 0.38000 inches and minimum length is 0.08660 inches. For the arc between points F and E, the maximum arc radius is 0.35080 inches and maximum arc length is 0.16910 inches and the minimum arc radius is 0.41000 inches and minimum length is 0.15750 inches. For the arc between points E and D, the maximum arc radius is 0.35080 inches and maximum arc length is 0.22980 inches and the minimum arc radius is 0.36000 inches and minimum length is 0.23070 inches. For the arc between points D and C, the maximum arc radius is 0.35080 inches and maximum arc length is 0.19450 inches and the minimum arc radius is 0.36000 inches and minimum length is 0.11270 inches. Again, the outside surface of the third embodiment clip can be enlarged or reduced in size by scaling the size of the arc radius and arc length of each arc between the points by applying the same percentage of change to each arc.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A wind turbine comprising a turbine assembly of at least two blades mounted to a blade retainer and a load shaft connected to said blade retainer, such that movement of said blades due to wind causes rotation of said load shaft, further including a clip having an aerodynamic shape mounted to each blade, said clip having a nose end and a blade end, said blade end including a blade slot to receive a blade, said clip having two sides between said nose end and said blade end, each of said two sides starting a midpoint of said nose end and leading towards said blade end, said sides together being an outside surface that forms said aerodynamic shape of said clip, each of said sides being composed of five arcs, a first arc of said side starting at said midpoint of said nose having an arc radius of 0.35080 inches and an arc length of 0.22395 inches, a second arc connected to said first arc having an arc radius between 0.09480 inches and 0.35080 inches and an arc length between 0.08660 inches and 0.09480 inches, a third arc connected to said second arc having an arc radius between 0.41000 inches and 0.35080 inches and an arc length between 0.15750 inches and 0.16910 inches, a fourth arc connected to said third arc having an arc radius between 0.36000 inches and 0.35080 inches and an arc length between 0.22980 inches and 0.23070 inches, a fifth arc connected to said fourth arc having an arc radius between 0.36000 inches and 0.35080 inches and an arc length between 0.11270 inches and 0.19450 inches, said fifth arc of each side forming said blade end and said blade slot.

2. The wind turbine of claim 1, wherein said clip is scaled to be a proper size to mount on a particular sized blade by changing arc lengths and arc radius of each arc of said clip by the same percentage.

3. The wind turbine of claim 1, wherein there is no gap between said fifth arc and said blade.

4. A wind turbine comprising a turbine assembly of at least two blades mounted to a blade retainer and a load shaft connected to said blade retainer, such that movement of said blades due to wind causes rotation of said load shaft, further including a frame assembly surrounding said turbine assembly, said frame assembly including a plurality of vanes to direct wind inside said frame assembly and towards said blades of said turbine assembly, each of said vanes being a blade assembly with a vane blade and a clip of an aerodynamic shape mounted on a leading edge of said vane blade and another clip mounted on a trailing edge of said vane blade, said clip having a nose end and a blade end, said blade end including a blade slot to receive a blade, said clip having two sides between said nose end and said blade end, each of said two sides starting a midpoint of said nose end and leading towards said blade end, said sides together being an outside surface that forms said aerodynamic shape of said clip, each of said sides being composed of five arcs, a first arc of said side starting at said midpoint of said nose having an arc radius of 0.35080 inches and an arc length of 0.22395 inches, a second arc connected to said first arc having an arc radius between 0.09480 inches and 0.35080 inches and an arc length between 0.08660 inches and 0.09480 inches, a third arc connected to said second arc having an arc radius between 0.41000 inches and 0.35080 inches and an arc length between 0.15750 inches and 0.16910 inches, a fourth arc connected to said third arc having an arc radius between 0.36000 inches and 0.35080 inches and an arc length between 0.22980 inches and 0.23070 inches, a fifth arc connected to said fourth arc having an arc radius between 0.36000 inches and 0.35080 inches and an arc length between 0.11270 inches and 0.19450 inches, said fifth arc of each side forming said blade end and said blade slot.

5. The wind turbine of claim 4, wherein said blades of the turbine assembly include a clip of an aerodynamic shape mounted on a leading edge of said blade and another clip mounted on a trailing edge of said blade, said clip having a nose end and a blade end, said blade end including a blade slot to receive a blade, said clip having two sides between said nose end and said blade end, each of said two sides starting a midpoint of said nose end and leading towards said blade end, said sides together being an outside surface that forms said aerodynamic shape of said clip, each of said sides being composed of five arcs, a first arc of said side starting at said midpoint of said nose having an arc radius of 0.35080 inches and an arc length of 0.22395 inches, a second arc connected to said first arc having an arc radius between 0.09480 inches and 0.35080 inches and an arc length between 0.08660 inches and 0.09480 inches, a third arc connected to said second arc having an arc radius between 0.41000 inches and 0.35080 inches and an arc length between 0.15750 inches and 0.16910 inches, a fourth arc connected to said third arc having an arc radius between 0.36000 inches and 0.35080 inches and an arc length between 0.22980 inches and 0.23070 inches, a fifth arc connected to said fourth arc having an arc radius between 0.36000 inches and 0.35080 inches and an arc length between 0.11270 inches and 0.19450 inches, said fifth arc of each side forming said blade end and said blade slot.

6. The wind turbine of claim 5, wherein each of said clips is scaled to be a proper size to mount on a particular sized blade by changing arc lengths and arc radius of each arc of said clip by the same percentage.

7. The wind turbine of claim 6, wherein each of said clips is scaled to be a proper size to mount on a particular sized blade by changing arc lengths and arc radius of each arc of said clip by the same percentage.

8. The wind turbine of claim 5, wherein there is no gap between said fifth arc and said blade.

9. The wind turbine of claim 6, wherein there is no gap between said fifth arc and said blade.

10. The wind turbine of claim 5, wherein a position of said vane is defined by said leading edge, trailing edge and an imagery line from a center of said frame assembly to said leading edge of said vane, wherein an angle is formed between said imagery line and a line between said leading edge and said trailing edge; wherein said angle is positive when said trailing edge is rotated counter clockwise from said imagery line and said angle is negative when said trailing edge is rotated clockwise from said imagery line; wherein when said vane is positioned with a positive angle the turbine assembly rotates in a clockwise direction and when said vane is positioned with a negative angle the turbine assembly rotate in the counter clockwise direction; and wherein an said vanes are positioned at an angle in the range of 35 to 50 degrees.

11. The wind turbine of claim 6, wherein a position of said blade of the turbine assembly is defined by said leading edge, trailing edge and an imagery line from a center of said turbine assembly to said leading edge of said blade, wherein an angle is formed between said imagery line and a line between said leading edge and said trailing edge; wherein said angle is positive when said trailing edge is rotated counter clockwise from said imagery line and said angle is negative when said trailing edge is rotated clockwise from said imagery line; and wherein an said are positioned at an angle in the range of −20 to +25 degrees for a turbine assembly rotating in the clockwise direction and a range of +20 to −25 degrees for a turbine assembly rotating in the counter clockwise direction.

12. The wind turbine of claim 6, wherein said frame assembly has perimeter that includes a front determined by where air strikes said frame assembly, wherein said frame assembly has a rear along said perimeter that is opposite said front, wherein said frame assembly has two sides between said front and said rear along said perimeter, wherein position of said vanes causes air flowing along said sides of said frame assembly to be capture and directed into a positive force to turn said turbine assembly in the same direction as the air which strikes the front of said frame assembly.

13. A method of capturing airflow along sides of a frame assembly of vanes of a wind turbine comprising:

adding a clip to a leading edge of each vane such that airflow striking the frame assembly outside the region of direct impingement is captured for use to power a turbine assembly within the frame assembly, the wherein the clip has an outside surface an aerodynamic shape, the clip having a nose end and a slot end, the slot end including a slot adapted to receive the leading edge of each vane, the clip having two sides between the nose end and the slot end, each of the two sides starting a midpoint of the nose end and leading towards the slot end, the sides together being the outside surface that forms the aerodynamic shape of the clip, each of the sides being composed of five arcs, a first arc of said side starting at said midpoint of said nose having an arc radius of 0.35080 inches and an arc length of 0.22395 inches, a second arc connected to said first arc having an arc radius between 0.09480 inches and 0.35080 inches and an arc length between 0.08660 inches and 0.09480 inches, a third arc connected to said second arc having an arc radius between 0.41000 inches and 0.35080 inches and an arc length between 0.15750 inches and 0.16910 inches, a fourth arc connected to said third arc having an arc radius between 0.36000 inches and 0.35080 inches and an arc length between 0.22980 inches and 0.23070 inches, a fifth arc connected to said fourth arc having an arc radius between 0.36000 inches and 0.35080 inches and an arc length between 0.11270 inches and 0.19450 inches, said fifth arc of each side forming said blade end and said blade slot.

\* \* \* \* \*